United States Patent
Borenstein

(10) Patent No.: US 9,838,446 B2
(45) Date of Patent: Dec. 5, 2017

(54) FACILITATING USER COMMUNICATION ABOUT A COMMON TOPIC

(71) Applicant: Mimecast North America, Inc., Watertown, MA (US)

(72) Inventor: Nathaniel S. Borenstein, Greenbush, MI (US)

(73) Assignee: MIMECAST SERVICES LTD., London (GB)

( * ) Notice: Subject to any disclaimer, the term of this patent is extended or adjusted under 35 U.S.C. 154(b) by 10 days.

(21) Appl. No.: 15/090,652

(22) Filed: Apr. 5, 2016

(65) Prior Publication Data

US 2016/0239558 A1    Aug. 18, 2016

Related U.S. Application Data

(63) Continuation of application No. 14/025,903, filed on Sep. 13, 2013, now Pat. No. 9,432,419.

(51) Int. Cl.

| G06F 15/16 | (2006.01) |
|---|---|
| H04L 29/06 | (2006.01) |
| H04L 12/58 | (2006.01) |
| H04L 12/18 | (2006.01) |
| G06F 17/30 | (2006.01) |

(52) U.S. Cl.
CPC ...... *H04L 65/403* (2013.01); *G06F 17/30312* (2013.01); *G06F 17/30598* (2013.01); *H04L 12/1818* (2013.01); *H04L 51/04* (2013.01); *H04L 51/32* (2013.01)

(58) Field of Classification Search
None
See application file for complete search history.

(56) References Cited

U.S. PATENT DOCUMENTS

| 7,610,287 B1 * | 10/2009 | Dean ................. G06F 17/30699 |
|---|---|---|
| 2003/0028525 A1 | 2/2003 | Santos |
| 2007/0016585 A1 * | 1/2007 | Nickell ............. G06F 17/30864 |
| 2008/0003964 A1 | 1/2008 | Alperin et al. |
| 2008/0033930 A1 | 2/2008 | Warren |
| 2008/0097822 A1 * | 4/2008 | Schigel ................ G06Q 10/063 705/7.33 |
| 2008/0222295 A1 | 9/2008 | Robinson et al. |
| 2008/0306935 A1 * | 12/2008 | Richardson ............. H04L 51/32 |
| 2009/0132706 A1 | 5/2009 | Blythe |
| 2010/0205541 A1 * | 8/2010 | Rapaport ............... G06Q 10/10 715/753 |

(Continued)

FOREIGN PATENT DOCUMENTS

WO    WO 2012/116197    8/2012

OTHER PUBLICATIONS

European Search Report for App. Ser. No. EP 13 18 9560, dated Feb. 5, 2014, 3 pages.

(Continued)

*Primary Examiner* — Natisha Cox
(74) *Attorney, Agent, or Firm* — Brown Rudnick LLP; Mark S. Leonardo

(57) ABSTRACT

Among other things, we describe identifying, in first data available to a first user and not available to a second user, and in second data available to the second user not available to the first user, data pertaining to a common topic, and enabling the first user and the second user to communicate about the common topic based on the identification.

23 Claims, 10 Drawing Sheets

(56) References Cited

U.S. PATENT DOCUMENTS

| | | | |
|---|---|---|---|
| 2011/0142016 A1* | 6/2011 | Chatterjee | G06Q 30/02 370/338 |
| 2012/0005224 A1 | 1/2012 | Ahrens et al. | |
| 2013/0103686 A1 | 4/2013 | Sisneros | |
| 2013/0185323 A1* | 7/2013 | Moser | G06F 17/30867 707/769 |
| 2013/0326362 A1 | 12/2013 | Murray et al. | |
| 2014/0013240 A1 | 1/2014 | Ganesh | |
| 2014/0101243 A1* | 4/2014 | Naveh | G06Q 50/01 709/204 |
| 2014/0164254 A1* | 6/2014 | Dimmick | G06Q 20/3674 705/71 |
| 2014/0164524 A1 | 6/2014 | Chung et al. | |
| 2015/0081802 A1 | 3/2015 | Borenstein | |

OTHER PUBLICATIONS

European examination report for App. Ser. No. EP 13 18 9560.9, dated Feb. 12, 2014, 5 pages.

Reply to examination report for App. Ser. No. 13 18 9560.9, dated Jun. 10, 2014, 14 pages.

* cited by examiner

600 ⌐
http://company1.com/collaboration/customize

User Collaboration Settings: User A

604 {
Allow Collaboration Search to analyze your content? ⌐608
● Yes ○ No

Allow Collaboration Search to share your content? ⌐610
● Yes ○ No

606 {
Do you want to receive user collaboration recommendations? ⌐612
● Yes ○ No May Collaboration Search recommend you to other users based on your content? ⌐614
● Yes ○ No ⌐616
What is the maximum number of recommendations you wish to receive at a time? [5]

⌐618
How often do you want to receive recommendations?
[1] time(s) a [Day ▼]

Allowed user list: ⌐620

User B -> Artificial Intelligence
        -> Network Security
User X

Blocked user list: ⌐622

User D -> Artificial Intelligence
        -> User Collaboration
User Z

⌐624
Topics:

604 {
☐ Physical Sciences and Engineering
  ⌐628
  ☐ Chemical Engineering
  ☐ Chemistry
  ⌐626
  ☑ Computer Science
  ☐ Earth and Planetary Sciences ☐ Life Sciences
  ☐ Agricultural and Biological Sciences
  ☐ Biochemistry, Genetics, and Molecular Biology
  ☐ Environmental Science
  ☐ Immunology and Microbiology

FACILITATING USER COMMUNICATION ABOUT A COMMON TOPIC

RELATED APPLICATION

This application is a continuation (and claims the benefit of priority under 35 USC 120) of U.S. application Ser. No. 14/025,903, filed Sep. 13, 2013, the contents of which are incorporated herein in their entirety by reference.

BACKGROUND

This description relates to electronic communication. Electronic devices can be used to communicate with other users of other electronic devices using a variety of protocols.

SUMMARY

The electronic communicating that we describe here may encompass one or more of the following (and other) aspects, features, and implementations, and combinations of them.

In general, in a first aspect, a method includes identifying, in first data accessible to a first user and not accessible to a second user, and in second data accessible to the second user and not accessible to the first user, data pertaining to a common topic, and upon the identifying, providing the first or the second user with address data to connect to the respective other user via an electronic communication channel.

Implementations of this aspect may include one or more of the following features.

The first aspect could include a second aspect of determining that the first and second user fulfill a security constraint before the providing of the address data.

The first or second aspect could include a third aspect of, upon the providing of the address data, establishing the electronic communication channel between the first and second user.

The first, second, or third aspect could include a fourth aspect of sending a first message to the first user that indicates that the second user is interested in the common topic.

Any of the first through fourth aspects could include a fifth aspect of sending a first message to the first or second user that identifies the common topic and indicates that other users are interested in the common topic.

Any of the first through fifth aspects could include a sixth aspect in which the first data could be not accessible to the second user based on a permission setting associated with the first data.

Any of the first through sixth aspects could include a seventh aspect that includes, upon the providing of the address data, the first user making at least some of the first data accessible to the second user, or upon the establishing of the electronic communication channel, the first user making at least some of the first data accessible to the second user.

Any of the first through seventh aspects could include an eighth aspect of receiving the first and second data, and analyzing the first and second data to identify the common topic, wherein the analysis includes identifying one or more common words that are currently included in the first and the second data, calculating a current frequency of occurrence of the identified one or more common words in the first and the second data, and identifying the common topic as a topic that is associated with a common word of the one or more identified common words which has one of the highest current frequencies of occurrence in the first and second data.

The eighth aspect could include a ninth aspect of changing the content of the first or second data, recalculating the current frequency of occurrence of the identified one or more common words, adjusting the common topic to a topic that is associated with a common word of the one or more identified common words which has one of the highest recalculated current frequencies of occurrence in the current first and second data, and optionally notifying the first and second user of the adjusted common topic.

The ninth aspect could include a tenth aspect of adjusting the identified one or more common words based on the changed first or second data before the recalculating of the current frequency of occurrence of the adjusted identified one or more common words;

Any of the eighth through tenth aspects could include an eleventh aspect in which the identifying of the one or more common words and/or the calculating of the current frequency of occurrence of the identified one or more common words are performed during a change of the first or second data.

A twelfth aspect includes a computer program product encoded on a non-transitory, tangible storage medium, the product comprising computer-readable instructions for causing one or more computers to perform operations according to the first aspect.

A thirteenth aspect includes a computer system, that includes a database storing first data accessible to a first user and not accessible to a second user, and storing second data accessible to the second user and not accessible to the first user, an analysis engine configured to identify, in the first data and in the second data, data pertaining to a common topic, and a communication engine to provide, upon the identification of the common topic, the first or the second user with address data to connect to the respective other user via an electronic communication channel.

The thirteenth aspect can include a fourteenth aspect in which the communication engine is configured to establish the electronic communication channel upon the identification of the common topic.

The thirteenth or fourteenth aspect can include a fifteenth aspect in which the electronic communication channel is configured to communicatively connect a first communication device of the first user with a second communication device of the second user.

In another aspect, a method includes identifying, in first data available to a first user and not available to a second user, and in second data available to the second user not available to the first user, data pertaining to a common topic, and enabling the first user and the second user to communicate about the common topic based on the identification.

The subject matter described in this specification can be implemented in particular embodiments so as to realize one or more of the following advantages. In some implementations, matchmaking users may introduce two users who may not have met otherwise or may not have known about a common interest. In some implementations, introduction of a first user and a second user may facilitate collaboration on a project associated with a topic that interests both users. In some implementations, matchmaking users may reduce project redundancy within an organization. In some implementations, matchmaking users may reduce an organization's costs and/or reduce time to market of organization products or services.

Other aspects, features, and advantages will be apparent from the description and the claims.

DESCRIPTION OF THE FIGURES

FIGS. 4-6 are examples of user interfaces.

DETAILED DESCRIPTION

Figure 1:
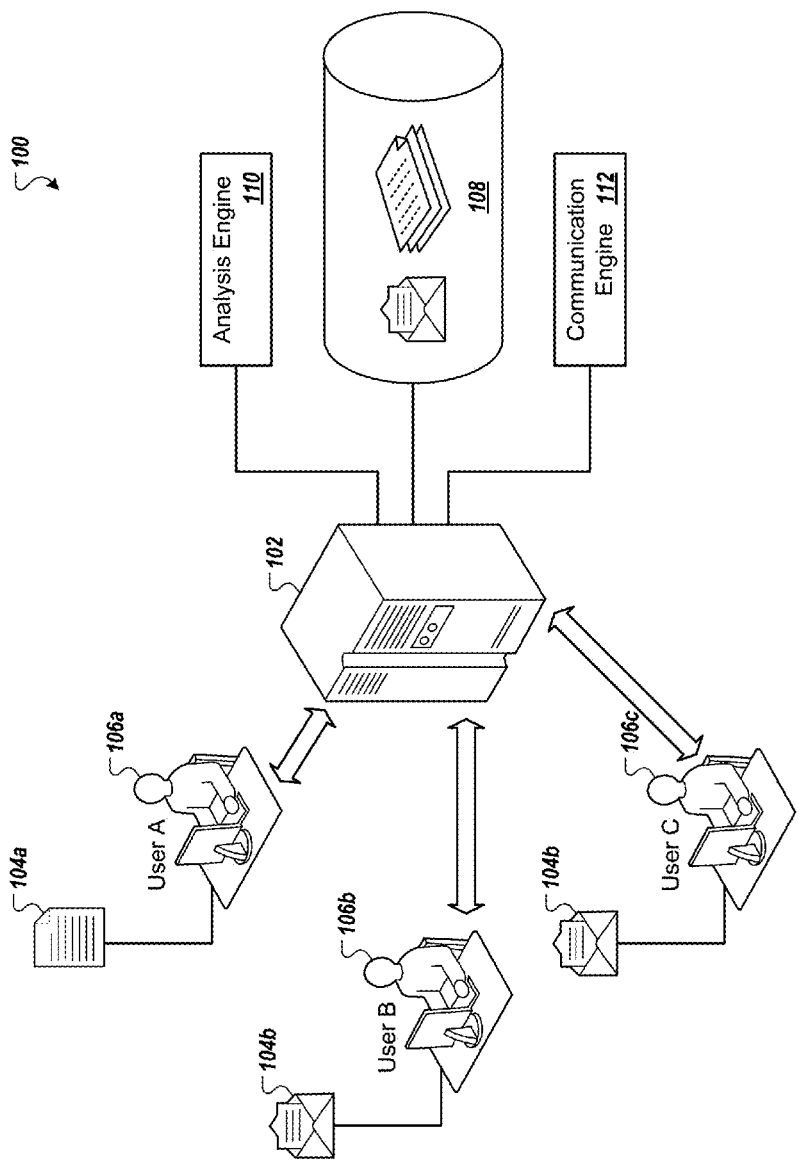
FIGS. 1-3 and 10 are block diagrams.

This disclosure generally relates to software, computer systems, and computer-implemented methods for providing archive-based matchmaking of electronic communications. Specifically, a unified archive is provided for creating organizational connections based on communication histories. Implementations of the present disclosure described herein may provide one or more of the following advantages:

First, an adaptive, substantially real-time, analysis of incoming data or network traffic in a network environment may be provided, which allows to selectively connect two users currently working on a common topic.

Second, automatically establishing an electronic communication session between the two users may be provided.

Third, especially adapted data security may be provided, which allows the two users to get into contact without revealing their data associated with the common topic.

Fourth, a user may be kept up to date of ongoing topics other users are currently working on and may be provided with the option to selectively establish communication sessions with selective other users that are working on a relevant topic. This may enhance efficiency and may reduce network traffic in a network environment.

When an organization stores all of the organization's artifacts in a single unified archive, the archive can be analyzed to determine which employees at the organization are working on or interested in related topics but not already communicating with each other. These employees can be introduced to each other and encouraged to see if their efforts will be helped by collaboration on the same project or projects.

The organization can facilitate the introduction of the employees in a manner that maintains the confidentiality of private information. In some implementations, if the fact that employees are working on a given area is considered sensitive, the system may ask these employees if they want such introductions before the system introduces the employees to each other. For example, the system may prompt the employees with "We have found other people working on nuclear energy. Would you like us to introduce you to them and let them know that you are working on nuclear energy?" In some examples, the system may introduce employees without specifying the topic of mutual interest, just saying "you have mutual interests" as a safeguard against accidental disclosure of sensitive project topics. This description may sometimes refer to this process of introducing potential collaborators to each other, or introducing one person to artifacts authored by another person, as "matchmaking."

In some implementations, instead of or in addition to the system prompting an employee about collaboration, the organization's employees can request collaboration matchmaking on a particular topic. For example, an employee can send the system a request stating that if there is anyone in the organization working on artificial intelligence that the employee would like to be introduced to them. Here the system may identify matches based on another employee indicating that they are interested in a topic or would like to collaborate on a specific topic (e.g., based on input in a user interface) or identify matches based on analysis of the archive.

In some implementations, the organization can provide employees with user configurable settings for the matchmaking process. For example, the system may allow the employees to specify how often they receive collaboration suggestions, how many collaboration suggestions the system provides each time, and a range of topics considered for matchmaking.

The term "artifact" as used in this description is a portion or fragment of data that forms an electronic communication. Any portion of data, such as any portion of an electronic communication, can be an artifact. Anything sent and received by a user of a communications application can be an artifact. Here, we use the term "application" generally to mean a program executable by a computer system. A user who uses any kind of user interface to use an application can be said to be "interacting" with the application.

The following are some examples of artifacts. An email message is an artifact. An email message typically has a topic (sometimes denoted by a "subject" field) and contains content written by a user about the topic. An email message can also relate to multiple topics. A portion that is less than all of an email can also be an artifact.

An email message has at least one recipient, and may have many recipients who are either individual users or groups of users (e.g., a mailing list of users). An email message could also contain multiple artifacts. For example, one portion of an email message body could be an artifact, and another portion (e.g., a portion relating to a different topic) could be a different artifact. An attachment to the email message could be yet another artifact, as could an in-line image within the email message.

As another example, a posting on a social networking service, or a portion of a posting, is an artifact. A posting on a social networking service is typically composed by a user and relates to a topic of interest for the user. The posting may be available to all other users linked to the user, or the posting may be available to only select users, or the posting may be available to all users of the social networking service, or the posting may be available to some other category or categories of users.

As another example, a portion of a real-time conversation is an artifact. For example, a real-time communication system, such as an instant messaging system that enables users to exchange short messages in real time, may be used to facilitate and record a series of messages related to a topic or multiple topics being discussed by users of the instant messaging system. The conversation may be held between two or more users; i.e., two or more users may participate in a single conversation, sometimes referred to as a single session. A transcript of messages exchanged in a single session may include one or more artifacts. Each message may be an artifact, or a portion of the conversation (e.g., a portion relevant to a particular topic) may be an artifact.

Other types of data that can be artifacts include syndication feeds (e.g., RSS feeds), voice data or other kinds of audio (e.g., recorded telephone calls, voice messages such as voicemail, transcripts of a spoken conversation, audio feeds, etc.), and video data (recorded video calls, video mail or video messages, security cameras, video feeds, etc.).

Thus, an artifact typically is characterized by having utility to a user or users. A portion of data that is not useful to a user (e.g., relevant to a topic of interest to a user) may be a non-useful artifact. For example, metadata that describes technical information (e.g., file size, location on disk) about a data file or electronic message is an artifact that may be useful or not. (In some scenarios, the metadata could be considered a useful artifact if the metadata were included in a system used by a technical user such as a system administrator, and the user identified the metadata as a portion of data of interest to the user.)

One way to distinguish useful artifacts from non-useful artifacts is to identify artifacts that have content created by users. For example, an email message composed by a user is considered a useful artifact because the content within was created by the user and is therefore relevant to (i.e., has utility for; this description sometimes uses the terms relevance and utility interchangeably) at least the user who created it. If at least one user can be identified as a source of a portion of data then the portion of data can be inferred to be a useful artifact. Another way to identify an artifact as useful is to determine that the artifact is associated with a topic of a topic that is known or assumed to have relevance or utility to users.

For example, if some artifacts are associated with the topic "Boston," and an electronic message appears to contain references to the city of Boston, then the electronic message or some portion of it can be inferred to be a useful artifact, one that is relevant to the topic "Boston." Another way to identify an artifact as a useful artifact is to provide an interface through which a user can designate artifacts as useful explicitly and directly. For example, if a user provides a data file through a user interface of a system that has as a designated purpose the receiving and storing artifacts having a particular topic, then the data file can be inferred to be an artifact relevant to that topic and therefore useful. So, if the interface provides a space containing data files relevant to the topic "Boston," and the user provides a data file to that space, then the provided data file can be inferred to be relevant to the topic "Boston."

The categories of applications described as examples here—email applications, social networking applications, and file management applications, and other electronic communicating facilities—all provide interfaces by which useful artifacts can be created, edited, sent, received, shared, managed, and otherwise used.

Each type of application may or may not be limited in the features associated with its type. Typically, however, their features are not entirely overlapping. For example, a social networking application typically has some features that an email application does not, and vice versa. However, all of the applications described above (as well as other types of applications not described in this document) provide features that enable user interaction with and use of artifacts.

The system and techniques described here can be implemented to allow a user to interact with or use artifacts that are created in different types of applications, including artifacts first created by users in email applications, artifacts first created by users in social networking applications, and artifacts first created by users in file management applications, among other kinds of applications.

FIG. 1 is a block diagram of an example environment 100 for facilitating user communication about a common topic. For example, the environment 100 includes a server 102 that stores artifacts 104a-b that are created by a plurality of users 106a-c (useful artifacts are sometimes referred to simply as artifacts). The server 102 analyzes the artifacts 104a-b to identify common topics that appear in the artifacts 104a-b and introduces the users associated with the artifacts that have a common topic so that the users may work together on the common topic.

The server 102 stores all of the artifacts 104a-b created by the users 106a-c of an organization in a database 108 (e.g., an archive). For example, the environment 100 may be associated with a single organization that is physically located in one physical location or multiple separate physical locations. The database 108 may be located at one of the organization's physical locations or another location (e.g., the physical location of an information technology provider).

Whenever one of the users 106a-c creates a document or another artifact 104a-b or after a delay, the environment 100 stores the artifact 104a-b in the database 108 and an analysis engine 110 analyzes the artifact 104a-b to identify topics associated with the artifact 104a-b. The topics can be predetermined (e.g., by an administrator of the server 102) or identified by the analysis engine 110 based on the reoccurrence of common themes in the artifacts stored in the database 108. For example, the administrator can periodically provide the analysis engine 110 with a list of topics that the analysis engine 110 uses when associating topics with the artifacts 104a-b. As another example, the analysis engine 110 may use artificial intelligence or another appropriate method to determine the list of topics for the artifacts stored in the database 108. For example, the topics may be based on the reoccurrence of terms or phrases in the artifacts that are associated with a particular topic. As another example, the server 102 may generate the list of topics from one or more topics identified by the users 106a-c.

The analysis engine 110 clusters the users 106a-c based on the topics for the artifacts 104a-b and the users 106a-c who created or received the artifacts 104a-b. For example, a user A 106a may be associated with the topic of "computer science" based on a publication 104a written by the user A 106a, while the users B 106b and C 106c may be associated with the topic of "computer science" based on an email 104b sent from the user B 106b to another user C 106c.

The analysis engine 110 identifies relationships between the users in a particular cluster and determines which users already communicate regularly and thus do not need to be introduced. For example, the analysis engine 110 determines that the users B 106b and C 106c, who are both in the computer science cluster, regularly communicate about computer science but that the user A 106a does not communicate with either of the users B 106b or C 106c. Although the general topic of "computer science" is used as an example here, the topic identified by the analysis engine 110 could be more specific. For example, the topic identified could be "database optimization" or "optimization of the particular database stored on the organization's server." The analysis engine 110 could also identify multiple topics, e.g., at different levels of specificity, for a particular set of artifacts 104a-b under analysis.

A communication engine 112, included in the server 102, receives information from the analysis engine 110 that identifies which users are included in the same topic clusters and do not communicate with each other, and provides introductions to these users. For example, the communication engine 112 provides a message to the user A 106a that asks if the user A 106a would like to be introduced with either of the other users 106b-c based on all of the users working on the same topic of "computer science."

Figure 2:
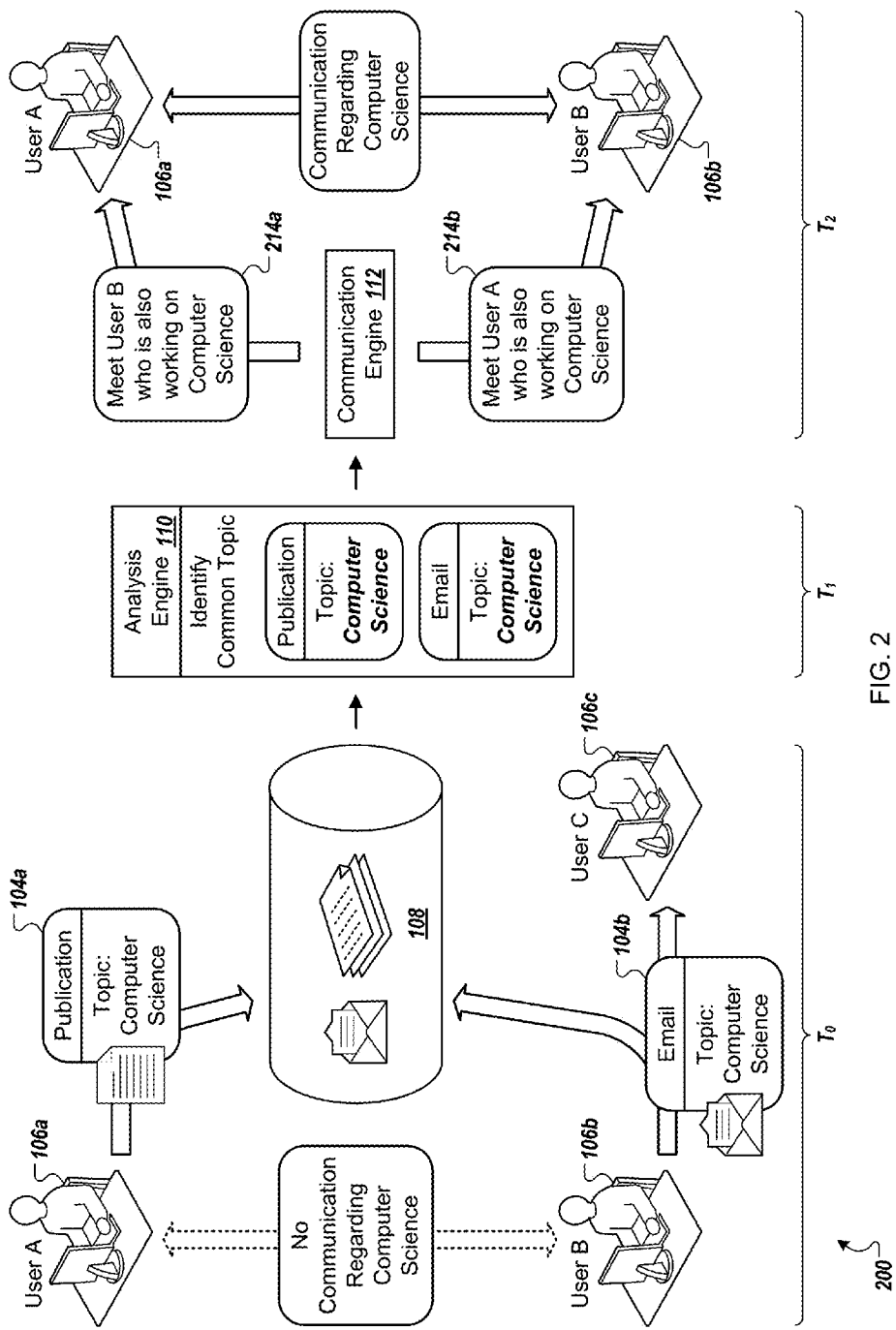

FIG. 2 is an example of an environment 200 facilitating communication about a common topic between multiple users. For example, during time period $T_0$, the environment 200 includes two users 106a-b, user A and user B, who do not send communications regarding "computer science" to each other.

The user A 106a and the user B 106b may or may not communicate about other topics during time period $T_0$. For example, the user A 106a and the user B 106b may communicate about a non-work related topic such as attending a sporting event, but the environment 200 does not include any data that indicates that the user A 106a and the user B 106b have communicated about the topic "computer science."

The user A 106a, during time period $T_0$, saves the publication 104a to their computer and the server 102 receives a copy of the publication 104a and stores the publication 104a to the database 108. The publication 104a may be a document about computer science created by the user A 106a or a computer science article that the user A 106a found in a journal and saved on their computer, to name a few examples.

The user B 106b, during time period $T_0$, creates the email 104b and sends the email 104b to another user C 106c. The email 104b may include work related or non-work related computer science content.

The server 102 receives the email 104b and stores the email 104b in the database 108. For example, the server 102 may include an email service (e.g., an email service maintained by or on behalf of the organization that employs the user B 106b) and the server 102 may automatically send a copy of the email 104b to the database 108 after the email 104b is created. As another example, the server 102 may receive the email 104b from another server and store the email 104b in the database 108.

The duration of the time period $T_0$ may be any length of time. For example, the time period $T_0$ may have a duration of seconds, minutes, or days. As other examples, the time period $T_0$ may be months or years long.

During time period $T_1$, the analysis engine 110 analyzes the publication 104a and the email 104b and identifies a common topic of the two artifacts 104a-b. For example, the analysis engine 110 determines that the user A 106a wrote the computer science publication 104a and the other user B 106b wrote the work related computer science email 104b during the time period $T_0$.

The duration of the time period $T_1$ may be any length of time. The time period $T_1$ may have a duration of seconds, minutes, or days, to name a few examples, depending on when the publication 104a and the email 104b are created and when the analysis engine 110 analyzes the publication 104a and the email 104b (e.g., according to an analysis schedule of the analysis engine 110).

Further, the time period $T_1$ may overlap one or more portions of the time period $T_0$. For example, the user A 106a may create the publication 104a and when the publication 104a is archived in the database 108, the analysis engine 110 analyzes the publication 104a. The environment 200 may exist in this state for a period of time, such as one and a half years (or any other period of time), before the user B 106b creates the email 104b and sends the email 104b to the other user C 106c. The analysis engine 110 then analyzes the email 104b and determines that the two artifacts 104a-b are associated with the common topic of "computer science." In some implementations, the analysis engine 110 may also give lesser weight to older publications, e.g., by assigning a score to each publication based on its age, such that older publications have a lower score.

Based on the identification of the common topic in the two artifacts 104a-b, the communication engine 112, during time period $T_2$, facilitates communication between the user A 106a and the user B 106b regarding "computer science." For example, the communication engine 112 may send a first message 214a to the user A 106a that introduces the user A 106a to the user B 106b and mentions that both users 106a-b are working on "computer science" research. As another example, the first message 214a may indicate that both users 106a-b are interested in the common topic of "computer science" and may be able to collaborate together on a project.

During time period $T_2$, the communication engine 112 may also send a second message 214b to the user B 106b that introduces the user B 106b to the user A 106a. The second message 214b may include a format similar to the first message 214a. In some implementations, the communication engine 112 sends a single message to both the user A 106a and the user B 106b.

The duration of the time period $T_2$ may be any length of time. For example, the duration of the time period $T_2$ may be based on settings (e.g., communication settings or privacy settings) associated with one or both of the users A 106a and B 106b.

Further, the time period $T_2$ may overlap one or more portions of the time period $T_0$. For example, after the analysis engine 110 analyzes the publication 104a and the email 104b and determines that both artifacts are associated with a common topic, the communication engine 112 may wait for a period of time before sending one or both of the messages 214a-b to the users 106a-b.

In some implementations, both of the users A 106a and B 106b work on projects with a common topic (e.g., "computer science") during time period $T_0$. In some implementations, the users A 106a and B 106b do not work on projects with a common topic during time period $T_0$. For example, during the time period $T_0$ the user A 106a may work on biology projects and the user B 106b may work history projects, and, based on the introduction by the communication engine 112, the two users A 106a and B 106b may work on a computer science project together during the time period $T_2$. In another example, the user A 106a may work on biology projects and the user B 106b may work on computer science projects during the time period $T_0$.

In some implementations, the time periods $T_0$, $T_1$, and $T_2$ can overlap. For example, operations performed in time period $T_0$ can be performed in parallel with operations performed in time period $T_1$. The analysis engine 110 could, for example, begin an analysis of artifacts received during time period $T_0$ while further artifacts are received during time period $T_1$ even if the analysis performed during time period $T_0$ is not yet complete. The analysis being performed during time period $T_0$ could also be updated based on the artifacts received during time period $T_1$. In some examples, the analysis engine 110 can determine if the users 106a-b are converging on a common topic, or diverging from a common topic. For example, if the analysis during time period $T_0$ determines that the users are communicating about "computer science," the analysis engine 110 may wait until further artifacts are available to determine if the users are in fact communicating about a common topic of sufficient interest (e.g., above a threshold determined by the analysis engine). If the analysis engine 110 determines, during time period $T_1$, that the two users are still communicating about the common topic of "computer science" and/or a more specific topic of "cloud computing," the analysis engine 110 may then identify the users as users whom should be put in touch with each other. In contrast, if the analysis engine 110 determines during time period $T_1$ that the first user 106a is diverging toward a topic of "cloud computing" and the second user 106b is diverging toward a topic of "mobile device architecture" then the analysis engine 110 may identify the users as users whom need not be put in touch with each other. In this way, the analysis engine 110 can perform a real-time analysis that adapts based on the artifacts received and the information derived from the artifacts.

Figure 3:
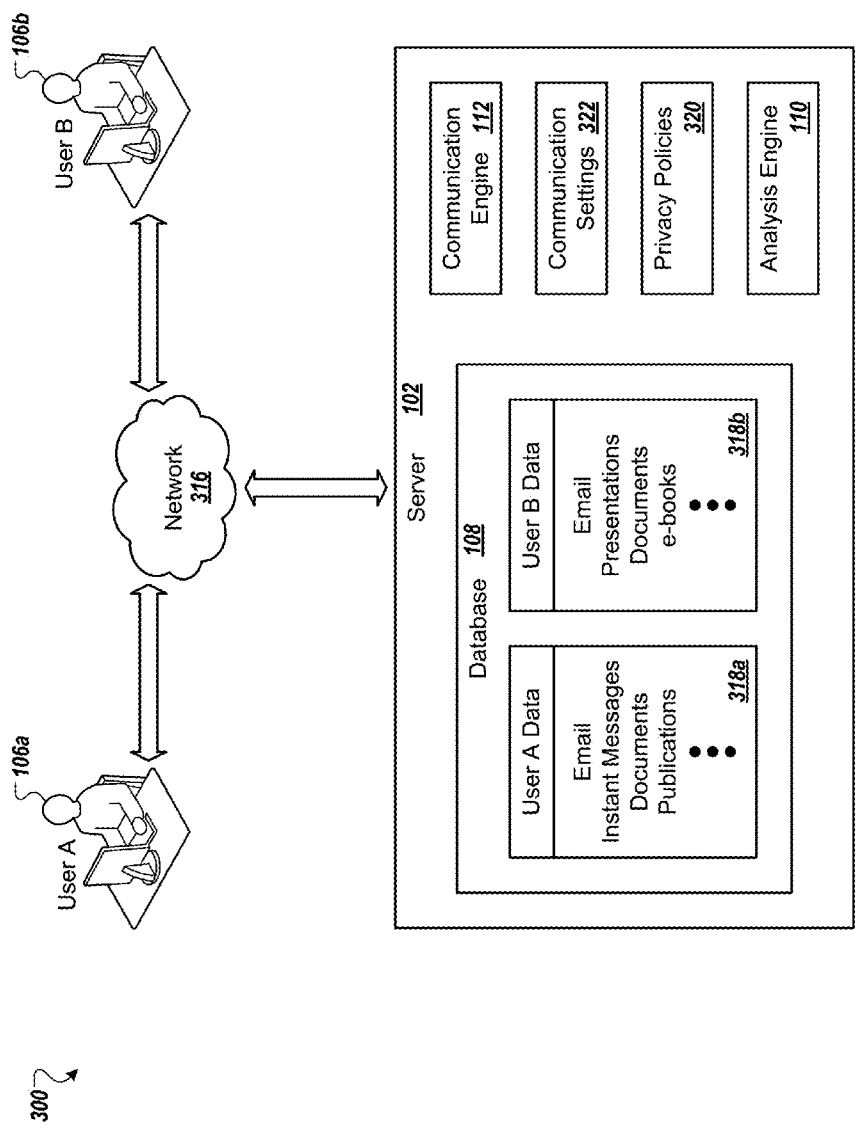

FIG. 3 is a detailed example of an environment 300 for facilitating user communication about a common topic. For example, the environment 300 includes a network 316, such as a local area network (LAN), wide area network (WAN), the Internet, or a combination of networks, that connects a plurality of user devices, associated with the users 106a-b, and the server 102. The user devices may include personal computers, mobile communication devices, and other devices that can send and receive data over the network 316.

The database 108 includes user data for each of the users in the environment 300. For example, the database 108 includes user A data 318a and user B data 318b. The user A data 318a may include emails sent and received by the user A 106a, instant messages, documents, and publications saved or created by the user A 106a, among other artifacts. The user B data 318b may include emails, presentations, documents, and e-books, to name a few examples.

The analysis engine 110 analyzes all of the artifacts stored in the database 108 and identifies one or more topics associated with each of the artifacts. For example, the analysis engine 110 examines the content of each of the artifacts included in the user A data 318a and associates one or more topics with each of the artifacts. In one example, the analysis engine 110 identifies a computer science publication (e.g., the publication 104a) and determines that the publication is related to both "computer science" and "social science" (e.g., where the publication is about a computer program that studies user collaboration).

In some implementations, that analysis engine 110 analyzes each unique artifact once. For example, when the user B 106b sends the email 104b to the other user C 106c, the analysis engine 110, or another part of the server 102, determines that the same email 104b is included in both the user B data 318b and the data for the other user C 106c, and the analysis engine 110 analyzes the email 104b once.

The analysis engine 110 may associate one or more subtopics with each of the artifacts in the database 108. For example, the publication 104a may be associated with "artificial intelligence," and "user collaboration" in addition to, or instead of, "computer science" and "social science."

Based on the topics associated with the artifacts in the database 108, the analysis engine 110 determines one or more topics associated with each of the users in the environment 300. For example, the analysis engine 110 associates the topics "computer science" and "social science," or "artificial intelligence" and "user collaboration," with the user A 106a based on the publication 104a.

The analysis engine 110 may store the user-topic association information in the database 108, or in another database, or may infer the user-topic association information based on the artifacts in the database 108 associated with each of the users. For example, the analysis engine 110 determines, at run time, the topics associated with the user A 106a based on the artifacts included in the user A data 318a or, for example, based on information in the user A data 318a that indicates the topics associated with the user (e.g., topic settings associated with the user A 106a).

In some implementations, the server 102 includes a user cluster database that indicates which users in the environment 300 are associated with a particular topic. For example, the analysis engine 110 populates and/or updates the user cluster database after associating topics with artifacts in the database 108. For example, when the analysis engine 110 determines that the publication 104a is associated with the topics "computer science" and "social science," the analysis engine 110 adds the user A 106a to the "computer science" and the "social science" clusters in the user cluster database if the user A 106a does not already belong to those clusters.

In some implementations, the analysis engine 110 associates a user in the environment 300 with a topic based on a frequency of the topic occurring in the artifacts associated with the user. For example, the analysis engine 110 may compare a total number of artifacts that are associated with computer science content to a threshold frequency value and, if the total number is greater than the threshold frequency value, associate the user with the "computer science" topic.

The threshold frequency values may be a threshold value for all of the topics included in the environment 300 or may be for a specific topic (e.g., "computer science"). Further, the threshold frequency value may be a particular number (e.g., fifty artifacts) or may be a percentage (e.g., ten percent of the artifacts associated with a user).

In these implementations, when the analysis engine 110 determines that the number of artifacts, associated with a particular user and a specific topic, is not greater than the threshold frequency value, then the analysis engine 110 does not associate that particular user with the specific topic.

The analysis engine 110 may also perform communication analysis by analyzing the artifacts in the database 108 to identify users in the environment 300 who communicate with each other. For example, the analysis engine 110 may determine which users in the environment 300 already collaborate on a project associated with a particular topic or are likely to have otherwise discussed the particular topic.

The communication analysis may be performed on the basis of individual topics. For example, for each topic associated with a particular user, the analysis engine 110 may determine whether the particular user communicated with the other users in the same topic cluster. In one example, when the user A 106a is associated with a "computer science" cluster, the analysis engine 110 determines whether the user A 106a communicated with any of the other users in the "computer science" cluster.

As another example, the communication analysis may determine whether or not it is likely that two users have communicated at all. For example, the analysis engine 110 may determine whether each pair of users in the environment 300 have communicated or worked together.

The communication analysis can be performed based on any of the artifacts included in the database 108. For example, the communication analysis may be based on emails or instant messages sent from one user to another user, on artifacts that include multiple users' names (e.g., publications or presentations), or on calendar meetings that include multiple users as participants, to name a few examples.

The analysis engine 110 may store the results of the communication analysis in memory (e.g., on the server 102). For example, the communication information may be stored in the database 108, in the user cluster database, or in another database on the server 102. As another example, the analysis engine 110 may determine whether users communicate with each other, e.g., in general or for a specific topic, on the fly prior to sending collaboration information to the communication engine 112.

Based on the identification of users in the environment 300 who communicate with each other, the analysis engine 110 identifies users who do not communicate. The identification may be of two particular users who do not communicate about a specific topic that both of the particular users are interested in. As another example, the identification may be of two particular users who do not communicate at all or two particular users whom the analysis engine 110 determines are unlikely to have communicated with each other based on the artifacts in the database 108.

The analysis engine 110 provides the communication engine 112 with collaboration information that indicates users who do not communicate and are associated with a common topic. For example, when the analysis engine 110 determines that the user A 106a does not communicate with the other user B 106b and that both users 106a-b are interested in the topic "computer science," the analysis engine 110 provides the communication engine 112 with information indicating that both users 106a-b are associated with the same topic.

In some implementations, the analysis engine 110 determines whether one or more privacy policies 320 are associated with a user identified in the collaboration information before sending the collaboration information to the communication engine 112. For example, the analysis engine 110 may determine whether a user identified in the collaboration information would like to receive collaboration suggestions from the server 102, whether a user would like to receive collaboration suggestions for the common topic, whether the common topic is sensitive, and/or whether the environment 300 allows the user to communicate with another user identified in the collaboration information, as described in more detail below. In some examples, the analysis engine 110 may not provide the communication engine 112 with collaboration information for one or more users in the environment 300 based on one of the privacy policies 320. In this way, the analysis engine 110 can determine if the users that have been identified also fulfill any security constraints determined by the privacy policies (or any other source of security constraints).

After receiving the collaboration information, the communication engine 112 sends one or more collaboration messages to the users identified in the collaboration information, where the collaboration messages are based on one or more communication settings 322 associated with the indicated users. For example, each user in the environment 300 may specify how often he or she wishes to receive collaboration messages, as described in more detail below.

The users that receive the collaboration messages may then collaborate on a project associated with the common topic identified in the collaboration messages. For example, if the communication engine 112 sends the user A 106a and the user B 106b a collaboration message that enables the user A 106a and the user B 106b to communicate about the common topic, such as "computer science," then the user A 106a and the user B 106b may discuss the topic of "computer science" and potentially work together on a "computer science" related project.

In some implementations, the communication engine 112 determines whether or not to send a collaboration message to a user based on both the communication settings 322 and the privacy policies 320. For example, the analysis engine 110 provides the communication engine 112 with all potential collaboration matches for users who do not already communicate, and the communication engine 112 sends collaboration recommendations to the users in the environment 300 based on the privacy policies 320 and the communication settings 322.

In some implementations, the analysis engine 110 periodically analyzes the artifacts in the database 108. For example, the analysis engine 110 may analyze the artifacts in the database 108 weekly, semi-weekly, or monthly, e.g., according to an analysis schedule.

The analysis engine 110 may analyze all of the artifacts in the database 108 when performing analysis on the database 108. As another example, the analysis engine 110 may analyze only a subset of the artifacts in the database 108. For example, the analysis engine 110 may analyze only the new artifacts that have been added to the database 108 since the last analysis of artifacts in the artifacts in the database 108.

In some implementations, when the analysis engine 110 receives or determines a new list of topics, the analysis engine 110 analyzes all of the artifacts in the database 108. As another example, when the analysis engine 110 receives or determines the new list of topics, the analysis engine 110 may analyze only new artifacts added to the database 108 after the new list of topics was received according to the new list of topics.

In some implementations, the database 108 includes artifacts from multiple different organizations (e.g., multiple different businesses or other kinds of organizations). The multiple different organizations may collaborate together on one or more projects. The multiple different organizations may or may not work in the same field. For example, the database 108 may include artifacts from two different schools such that the server 102 introduces a first employee from one of the schools to a second employee from the other school so that the two employees can collaborate on a project or otherwise discuss a common topic of interest.

In some implementations, when the database 108 includes artifacts from multiple different organizations, the privacy policies 320 may include policies that prevent the server 102 from providing matchmaking between two organizations or between subsets of the organizations. For example, the privacy policies 320 may specify that employees within a certain division at one of the organizations may not be introduced to any employees at the other organization or to any employees at a similar division in the other organization. Another privacy policy may specify that the server 102 can provide matchmaking for managers and human resource employees, (e.g., for an employee morale initiative), while the server 102 may not provide matchmaking for any of the other employees at the two organizations.

In some implementations, the environment 300 allows a user to request a collaboration match from the server 102. In some examples, the user may specify a specific topic in which the user would like to collaborate.

In some implementations, when a user requests a collaboration match from the server 102, the server 102 provides the user with a greater quantity of matches than if the analysis engine 110 identified a potential collaboration match based on analysis of the database 108. For example, the server 102 determines that the user who asked for a collaboration match associated with "computer science" is more likely interested in a greater number of matches than if the server 102 determined that the user works in "computer science."

Figure 4:
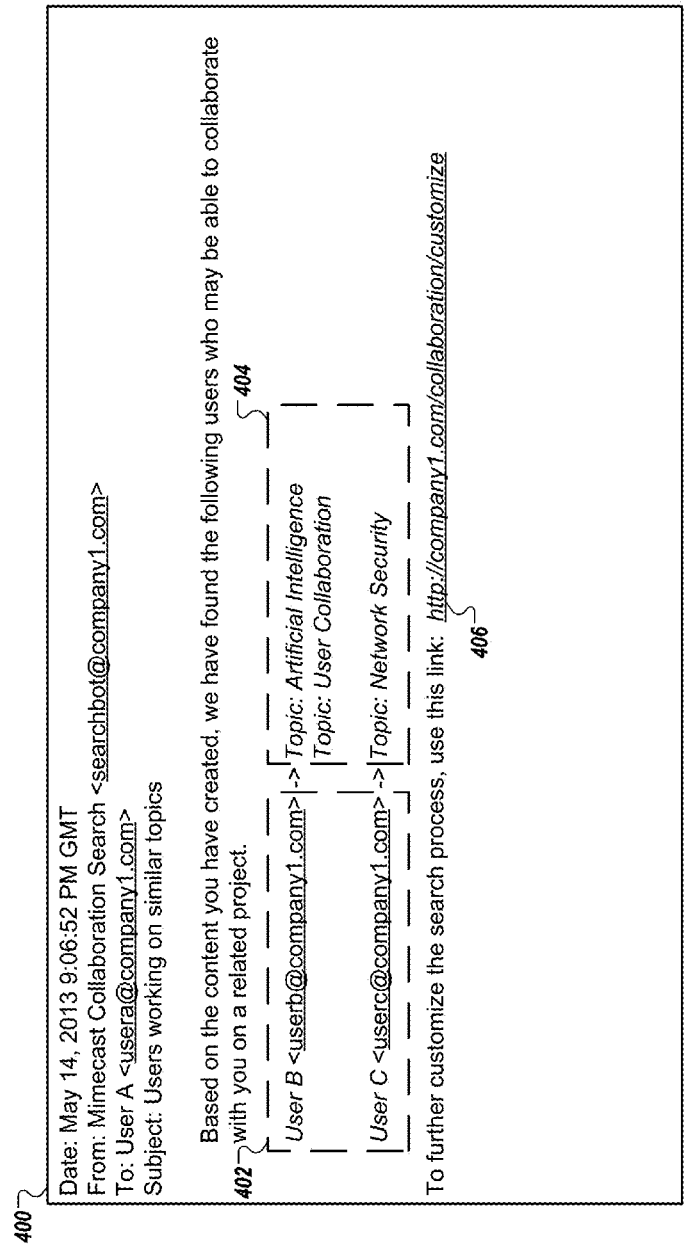

FIG. 4 is an example of a user interface 400 for indicating that users are interested in a common topic. For example, the server 102 may send a first message to a user device operated by a user A where the first message includes instructions for the user device to generate the user interface 400 and present the user interface 400 to the user A.

The user interface 400 identifies one or more other users 402 that are working on or interested in topics that the user A is also interested in. For example, the user interface 400 indicates that a user B and a user C are interested in topics that also interest the user A and introduces the user A to the user B and the user C.

The user interface 400 may indicate one or more topics 404 in which the other users 402 and the user A are interested. For example, the topics 404 may include "computer science" and "social science" (e.g., general topics). Here, the topics 404 include "artificial intelligence," "user collaboration," and "network security" (e.g., subtopics).

Upon viewing the user interface 400, the user A may contact at least one of the other users 402 to communicate about one of the topics 404. For example, the user A may ask the user B "In which artificial intelligence fields are you conducting research?" or "Would you like to discuss artificial intelligence over lunch?" or "Shall we schedule a phone call?" As another example, or in addition to asking about artificial intelligence, the user A may ask the user B or the server 102 for access to some of the user B's artificial intelligence documents or artifacts.

In some implementations, the user interface 400 includes a user settings link 406. For example, upon selection of the user settings link 406, the user A may be presented with a user interface that allows the user to specify one or more privacy settings and/or communication settings. In one example, the user A is presented with the user interface 600, described below with reference to FIG. 6.

Figure 5:
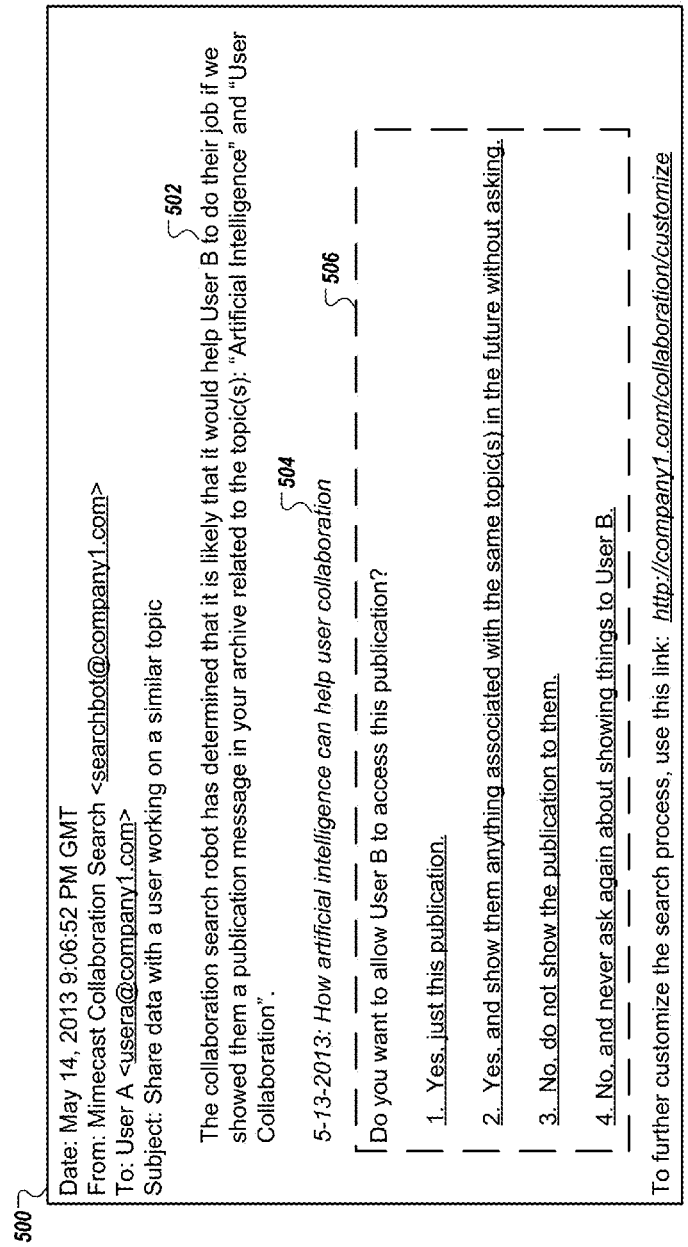

FIG. 5 is an example of a user interface 500 for requesting access to user data. For example, the user interface 500 introduces a user A to a user B and allows the user A to indicate whether the user B should have access to some of the user A's data.

The user interface 500 includes an introduction 502 that indicates that user B is interested in a common topic that also interests the user A. The introduction 502 identifies the common topic or topics that interest both of the users and may provide the user A with additional information, such as information that indicates user B is conducting research on the common topics and is not just interested in the common topic.

An artifact list 504 in the user interface 500 specifies one or more of user A's artifacts that may interest the user B. For example, the artifact list 504 includes a publication "How artificial intelligence can help user collaboration" and indicates that the publication was last saved on May 13, 2013.

The user interface 500 includes a user prompt 506 that asks the user A whether the server 102 should allow the user B to access the artifacts identified in the artifact list 504. For example, the user A may select a first option that allows the user B to access the publication "How artificial intelligence can help user collaboration" or a second option that allows the user B to access any of user A's artifacts that are associated with a similar topic or topics (e.g., the topics of "artificial intelligence" and "user collaboration").

As another example, the user A may select a third option that indicates the user B should not be allowed to access the user A's copy of the publication "How artificial intelligence can help user collaboration" or a fourth option that indicates that the user B should never (e.g., now or in the future) be allowed to access any of the user A's data.

In some implementations, the user interface 500 may include other options in addition to or instead of the options presented in the user prompt 506 of FIG. 5. For example, the user prompt 506 may include an option that allows the user A to request access to some of the user B's artifacts.

In some implementations, selection of the third option or the fourth option in the user prompt 506 does not prevent the user B from accessing another copy of the publication "How artificial intelligence can help user collaboration." For example, if the user A provided a copy of the publication to a user D, the user D may allow the user B to access the copy of the publication that is included in the user D's data in the database 108.

FIG. 6 is an example of a user interface 600 for specifying privacy settings and communication settings. For example, the user interface 600 includes a settings field 602 with one or more privacy settings 604 and one or more communication settings 606.

The privacy settings 604 allow a user to specify whether the analysis engine 110 analyzes a user's data, the types of collaboration recommendations provided to the user, and who the server 102 suggestions for collaboration. For example, if the user A 106a selects "No" for an analyze content option 608, the analysis engine 110 would not analyze the user A data 318a when associating topics with the artifacts in the database 108.

In some implementations, when the user A 106a selects "No" for the analyze content option 608, the server 102 does not store the user A data 318a in the database 108. For example, the server 102 would not automatically retrieve data created by the user A 106a or messages sent to or from the user A 106a.

A collaboration recommendations option 612 allows a user to specify whether the user would like to receive collaboration recommendations. For example, if the user A 106a selects "No" for the collaboration recommendations option 612, the server 102 will analyze the user A data 318a and provide other users in the environment 300 with collaboration recommendations based on the artifacts in the user A data 318a (e.g., the server may send a message to the other user that introduces the other user to the user A 106a) without providing collaboration recommendations to the user A 106a.

A collaborative users option 614 allows a user to specify whether the server 102 should provide other users in the environment 300 with collaboration recommendations based on the user's data. For example, if the user A 106a selects "No" for the collaborative users option 614, the server 102 will not provide collaboration recommendations to the other users in the environment 300 based on the artifacts in the user A data 318a.

Selection of "No" for both the collaboration recommendations option 612 and the collaborative users option 614 allows the server 102 to analyze a user's data without providing collaboration recommendations to either the user (e.g., the user A) or the other users in the environment 300.

A maximum number of recommendations option 616 allows a user to specify the maximum number of collaboration recommendations, and document access requests, the user receives during a recommendation period. For example, the maximum number of recommendations option 616 may specify the total number of collaboration recommendations that are included in a single message. As another example, the maximum number of recommendations option 616 may specify the total number of collaboration recommendations and document access requests that the user receives in a day (e.g., based on the frequency the user receives collaboration messages from the server 102).

A recommendation frequency option 618 allows a user to specify how often the user would like to receive collaboration recommendations. For example, the user A may specify that the server provide collaboration recommendations to the user A once a day, once a week, or once a month if collaboration recommendations are found. In one example, the recommendation frequency option 618 specifies a maximum frequency of collaboration recommendations, and if the server 102 does not identify any collaboration recommendations during a specific period of time, the user A would not receive any collaboration recommendations during that specific period of time.

In some implementations, the user may receive multiple different collaboration messages from the server 102 during a single period of time. For example, the server 102 may send multiple collaboration recommendation messages and/or document access requests, and all of the multiple collaboration messages may be received at substantially the same time. In some examples, when the user A indicates that they would like to receive collaboration messages once a day, the user A may receive all of the collaboration messages within a relatively short period of time, e.g., within a five minute time window.

The user interface 600 includes an allowed user list 620 and a blocked user list 622 that indicate specific users that may or may not, respectively, access a user's artifacts or that may or may not, respectively, be recommended for collaboration with the user. The allowed user list 620 and/or the blocked user list 622 may be populated by the server 102 based on responses received from a user and/or may be populated by the user (e.g., using the user interface 600).

For example, the server 102 may populate one or both of the allowed user list 620 and the blocked user list 622 based on responses received in reply to selection of one of the options in the user prompt 506 shown in FIG. 5. In one example, upon user selection of the second option that allows the user B to access all of the user A's artifacts that are associated with a specific topic, such as "artificial intelligence," the server 102 identifies the user B in the allowed user list 620 and indicates that the user B may access artificial intelligence artifacts created by the user A, in addition to artifacts associated with any other topics previously allowed (e.g., "network security").

Further, a user may manually specify one or more users in the allowed user list 620 and the blocked user list 622, and may indicate whether those users are associated with specific topics or with all of the user's data. For example, the user A may indicate that a user D should not have access to any of user A's artifacts that are associated with either "artificial intelligence" or "user collaboration." When the server 102 determines that the user A and the user D are interested in another common topic, such as "history," the server may send the user A and/or the user D a collaboration recommendation or a data access request. If, however, the server 102 determines that the user A and the user D are both interested in "artificial intelligence" or that either the user A or the user D have an artificial intelligence artifact that may be of interest to the other user, the server does not provide a collaboration recommendation or offer to allow the user other to access the artificial intelligence artifact.

When a first user manually identifies a second user in either the allowed user list 620 or the blocked user list 622 without identifying one or more topics associated with the second user, the server 102 does not provide any collaboration recommendations to the first user for the second user and does not allow either user access to the other user's artifacts, without preference to the topic or topics associated with the recommendations or the artifacts. For example, the server 102 would not provide the user A with a collaboration recommendation for the user Z.

In an example of the user A allowing all content to the user X, based on the identification of the user X in the allowed user list 620, when the server 102 identifies a document created included in the user A's data that may be of interest to the user X, the server 102 allows the user X to access the document without preference to the topic or topics associated with the document and without asking the user A if the user X may have access to the document.

The user interface 600 includes a topic list 624 that allows a user to select one or more topics of interest. For example, instead of or in addition to analysis of the user's artifacts by the analysis engine 110 to determine topics associated with the user, the user may select or deselect any of the topics in the topic list 624 to indicate which topics the server 102 should use for collaboration recommendations associated with the user.

For example, upon selection of a computer science option 626, the server 102 would provide the user A with computer science collaboration recommendations (e.g., after analyzing the artifacts in the database 108), assuming that the user A selected "Yes" to the collaboration recommendations option 612. If, however, the user A deselects the computer science option 626, or if the computer science option 626 was never selected for the user A, the server 102 would not provide the user A with any collaboration recommendations for the topic "computer science."

In some implementations, when the analysis engine 110 identifies a new topic associated with a user, the communication engine 112 provides the user with a message indicating the new topic. The message may allow the user to specify whether the user wants to be associated with the new topic. As another example, the message may only provide the user with information about the new topic (e.g., the topic name).

In some implementations, selection of the box adjacent to the computer science option 626 indicates whether the user A is interested in the topic "computer science," while selection of the underlined text "Computer Science" allows the user A to request a collaboration recommendation for computer science. For example, when the server 102 receives an indication that the user A selected the underlined text "Computer Science," the server 102 identifies one or more users included in a computer science user cluster that do not communicate with the user A about computer science and provides the user A with a collaboration recommendation indicating the identified one or more users from the computer science cluster.

In some implementations, when the server 102 provides a user with the topic list 624, the server 102 may analyze the database 108 to identify specific subtopics associated with a particular topic and provide the user with collaboration recommendations for a particular subtopic when the user has indicated that they would like to receive collaboration recommendations for the associated general topic. For example, when the user A indicates that they would like to receive collaboration recommendations for the general topic of "Computer Science," by selection of the computer science option 626, and the server 102 determines that both the user A and another user are working on "artificial intelligence," the system provides the user A with a collaboration recommendation that identifies the other user as a potential collaborator for artificial intelligence research based on the selection of the computer science option 626.

In some implementations, when the server 102 identifies a collaboration recommendation for a topic that is not selected in the topic list 624, the server does not provide the user A with the collaboration recommendation. For example, if the server 102 determines that the user A is interested in "chemical engineering" and that another user interested in chemical engineering does not communicate with the user A, the server 102 would not provide the user A with a collaboration recommendation identifying the other user and "chemical engineering."

Further, if the server 102 determines that the user A and another user are both interested in "materials engineering," a subtopic of "Chemical Engineering," the server 102 would not provide the user A with a collaboration recommendation identifying the other user and materials engineering based on the user A indicating that they do not want "Chemical Engineering" collaboration recommendations (e.g., the user A not selecting a chemical engineering option 628 in the topic list 624).

In some implementations, when the user A selected "No" for the analyze content option 608 and later selects "Yes" for the analyze content option 608, the analysis engine 110 analyzes the user A data 318a upon determining that the user selected "Yes" for the analyze content option 608. As another example, the analysis engine 110 may analyze the user A data 318a the next time the analysis engine 110 analyzes artifacts in the database 108. For example, the analysis engine 110 analyzes the user A data 318a as part of the analysis schedule for the analysis engine 110.

In some implementations when analyzing a user's data, the server 102 determines whether an artifact included in the user's data is work related or non-work related. For example, the server 102 may provide collaboration recommendations for topics associated with work related artifacts but not for topics that are only associated with non-work related artifacts. The server 102 may use any appropriate algorithm to determine whether an artifact is work related or non-work related. In some implementations, the user interface 600 includes an option that allows a user to indicate whether the server 102 should provide the user with collaboration recommendations for topics only associated with non-work related artifacts (e.g., an analyze non-work related artifacts option).

In some implementations, the user interface 600 includes a sensitive topics option. The sensitive topics option may allow a user to specify whether the server 102 should not provide any collaboration recommendations for topics that are sensitive (e.g., that the user may not wish other users to know about), whether the server 102 should prompt the user about a sensitive topic prior to providing collaboration recommendations for sensitive topics (e.g., to the user or another user), or whether the server 102 should provide neither a prompt nor a recommendation for sensitive topics.

The user interface 600 may include an input field that allows a user to define one or more sensitive topics. For example, the topic list 624 may include an additional box adjacent to each of the topics that allows a user to define which topics are sensitive for the user. As another example, the user interface 600 may include a field similar to the allowed user list 620 that allows the user to define one or more sensitive topics.

In some implementations, the collaborative users option 614 is one of the privacy settings 604 instead of one of the communication settings 606. In some implementations, all of the settings presented in the user interface 600 are privacy settings.

Figure 7:
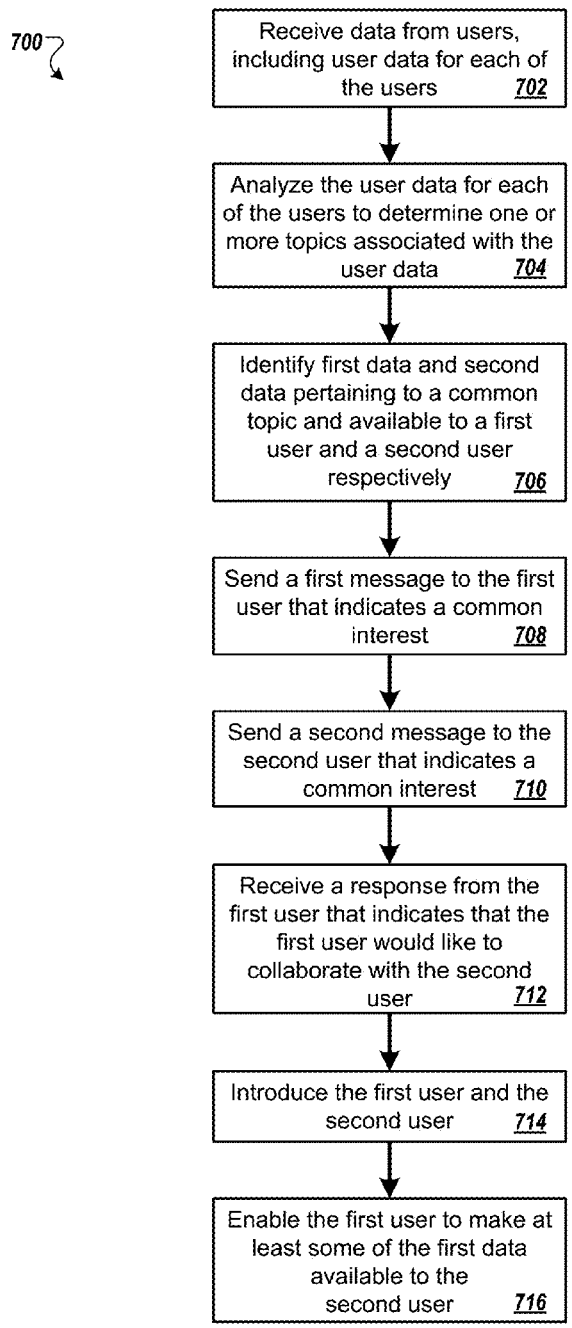
FIGS. 7-9 are flow diagrams.

FIG. 7 is a flow diagram of a process 700 for introducing a first user to a second user. For example, the process 700 can be carried out by the server 102 from the environment 100 shown in FIG. 1.

Data are received from users, including user data for each of the users (702). The user data may include one or more artifacts for each of the users.

The user data for each of the users are analyzed to determine one or more topics associated with the user data (704). For example, the server determines that the user A created one or more artifacts associated with the topics "artificial intelligence," "user collaboration," and "network security," and that the user B created one or more artifacts associated with the topics "artificial intelligence," and "user collaboration."

First data and second data pertaining to a common topic and available to a first user and a second user, respectively, are identified (706). The first data is available to the first user and not available to the second user and the second data is available to the second user and not available to the first user. For example, the server identifies an artificial intelligence publication written by the user A and an email written by the user B that discusses artificial intelligence.

In some implementations, the first data is not available to the second user based on a permission setting associated with the first data. For example, the first user may establish the permission setting indicating that the second user may not access the first data. In one example, the user A indicates that no other users should have access to the artificial intelligence publication. In another example, an information technology employee specifies one or more permission settings for the first data that prevent the second user from accessing the first data.

A first message that indicates a common interest is sent to the first user (708). The first message indicates that other users are interested in the common interest (e.g., with or without indicating the common interest). In some examples, the first message identifies the common topic (e.g., as the common interest). The first message may indicate that other users are interested in the common topic. For example, the first message indicates that there are two other users interested in artificial intelligence. In some examples, the common topic is not identified in the message, but rather the message could indicate that a common topic has been determined to exist without explicitly indicating the topic. For example, the common topic could be identified later in the process if the first user chooses to move forward with potentially collaborating with some or all of the other users.

In some implementations, the indication that other users are interested in a common interest includes an identification of the second user. For example, the first message may indicate that both the user B and the user D are interested in the topic "artificial intelligence."

A second message that indicates a common interest is sent to the second user (710). The second message indicates that other users are interested in the common interest (e.g., with or without indicating the common interest). In some examples, the second message identifies the common topic. The second message may indicate that other users are interested in the common topic. For example, the second message indicates that the system identified two other users who may be interested in collaborating on artificial intelligence research. In some implementations, the second message identifies the other users that are interested in the common topic. In some implementations, either or both users could be prompted to write their own introductory messages to each other. For example, the introductory messages could help the users decide whether to trust each other with sensitive information under consideration for sharing.

A response from the first user that indicates that the first user would like to collaborate with the second user is received (712). The response may be based on the sending of the first message. For example, the first user may receive the first message and select an option included in the first message, or reply to the first message, to send a response to the server.

The first user and the second user are introduced (714). The introduction of the first user and the second user may be based on the receipt of the response from the first user. For example, the server sends a third message to the first user that identifies the second user. In some implementations, the server may schedule a meeting between the first user and the second user. The server may use any other appropriate method to introduce the first user and the second user.

In some implementations, the first user and the second user are enabled to communicate (e.g., the first user and the second user are introduced) based on determining that the first user and the second user do not communicate about the common topic. For example, the server may introduce the first user and the second user for collaboration regarding computer science upon determining that the first user and the second user did not previously discuss computer science together.

The first user is enabled to make at least some of the first data available to the second user (716). For example, the server may enable the first user to make data available to the second user based on the identification. In some examples, the server may enable the first user to make data available to the second user based on the receipt of the response from the first user.

For example, the server allows the first user to change one or more permission settings associated with the first data to allow the second user to access at least some of the first data. In another example, the server enables the first user to send one or more artifacts included in the first data to the second user.

In some implementations, a network folder or other shared workspace, such as a non-public area in a social networking system, may be created to which the first user and the second user have access. The first user may then place at least some of the first data in the network folder so that the second user may access the at least some of the first data. Any other appropriate method may be used to enable the first user to make at least some of the first data available to the second user.

The order of steps in the process 700 described above is illustrative only, and the introduction of the first user to the second user can be performed in different orders. For example, the server may send the second message prior to sending the first message. In another example, the server may receive the response from the first user prior to sending the second message.

In some implementations, the server enables the first user to make data available to the second user prior to sending the first message. For example, the first message may indicate that the first user may provide the second user access to at least some of the first data.

In some implementations, the second message indicates that the second user has access to at least some of the first data. In this example, the server may receive the response from the first user, enable the first user to make data available to the second user, and provide the second message to the second user.

In some implementations, the process 700 can include additional steps, fewer steps, or some of the steps can be divided into multiple steps. For example, the server may send the first message and the second message at substantially the same time (e.g., in the same step).

In some implementations, the first message and the second message are the same message. For example, the server may introduce the first user and the second user by sending the same message to the first user and the second user such that if one of the users replies to the message, the other user receives the reply. In these implementations, the first message introduces the first user and the second user.

In some implementations, the first user and the second user are introduced when the first user and the second user are both allowed access to a shared workspace. For example, the server may automatically create a shared workspace (e.g., a social networking space) with the first user and the second user having access to the shared workspace. In some examples, only the first user and the second user may access the shared workspace. In some examples, the use of the shared workspace for the first user and the second user may permit the introduction to be anonymous or pseudonymous (e.g., the first user and the second user are not identified by name on the shared workspace). Examples of shared spaces are described in a patent application titled "Electronic Communicating," U.S. Ser. No. 13/488,643, filed Jun. 5, 2012, which is hereby incorporated by reference in its entirety.

In some implementations, the first user and the second user are introduced anonymously. For example, the server may introduce the first user and the second user through an anonymous email or forum and the first user or the second user may decide to share their contact information with the other user. In some examples, the common topic may be identified by the anonymous email, forum, or other communication technique. In some examples, the common topic is not identified, e.g., the users are told that they may have an unidentified topic of interest in common.

In some implementations, the server requests a self-introduction from the first user and/or the second user. For example, the server may request a self-introduction from the first user (e.g., during step 708) and present the self-introduction to the second user (e.g., during step 710). The server may request one or more self-introductions from users prior to introducing the users to other users in the organization. In some examples, when presented with a self-introduction request, a user may provide a self-introduction to the server, request a system generated introduction, or decline introduction to another user or other users.

In some implementations, the server identifies the first data and the second data separately. For example, the server may identify the first data and then identify the second data approximately a week or a month later.

In some implementations, the first user contacts the second user directly. For example, the first message may include an email address for the second user. In that case, the first user may email the second user employing the second user's email address. In these implementations, the server introduces the first user and the second user in the first message.

In some implementations, the server performs steps 706 and 714 without performing the other steps of the process 700. For example, the server identifies the first data and the second data pertaining to a common topic and enables the first user and the second user to communicate about the common topic based on the identification.

In some implementations, the server performs the process 700 without performing step 716. For example, the server introduces the first user and the second user and does not enable the first user to make at least some of the first data available to the second user.

Figure 8:
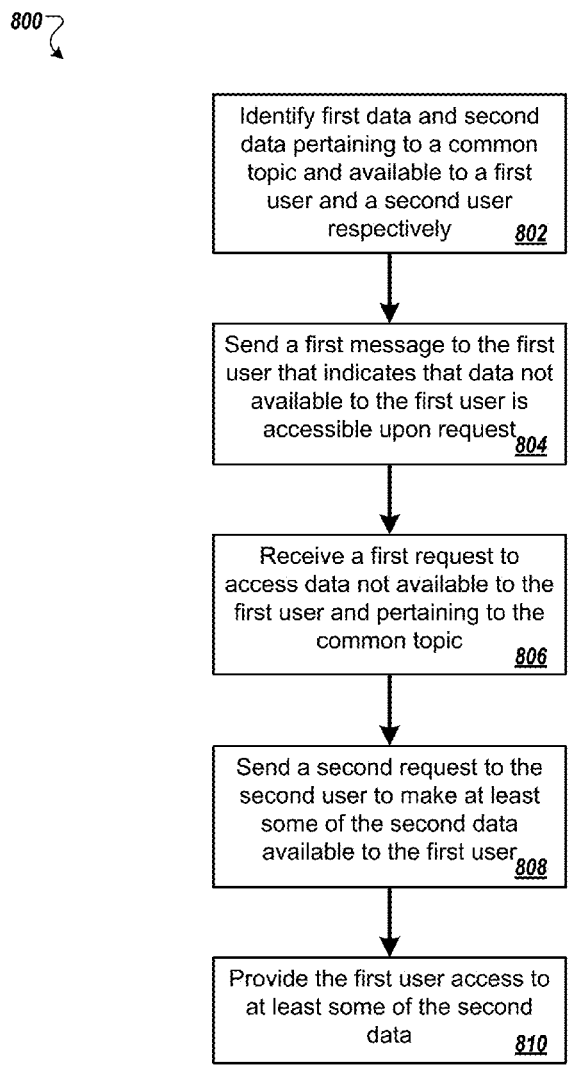

FIG. 8 is a flow diagram of a process 800 for providing a first user access to at least some of a second user's data. For example, the process 800 can be used by the server 102 from the environment 100 shown in FIG. 1.

First data and second data pertaining to a common topic and available to a first user and a second user, respectively, are identified (802). The first data is available to the first user and not available to the second user and the second data is available to the second user not available to the first user. For example, the server identifies the first data and the second data as described above with reference to step 706 in FIG. 7.

Once the common topic is identified, the first user and the second user can be enabled to communicate about the common topic based on the identification. The following operations together are an example of a technique in which this communication can be enabled. Other types of operations could also be performed to enable this communication, e.g., in addition to or instead of some or all of the operations.

A first message is sent to the first user that indicates that data not available to the first user is available upon request (804). The first message may identify the common topic associated with the data that is not available to the first user. For example, the first message may specify that "computer science" data is available to the first user upon request. In some examples, the first request may identify specific documents or types of documents that are available upon request. In some examples, the first request may identify the second user.

A first request to access data not available to the first user and pertaining to the common topic is received (806). The server may receive the first request from the first user. For example, the server receives the first request from the first user where the first request indicates that the first user requires access to the data that is not currently available to the first user.

In some implementations, the first request includes an indication of the common topic. For example, the first request identifies the common topic as "computer science."

A second request to the second user to make at least some of the second data available to the first user is sent (808). The server may send the second request in response to the identification of the second data. The server may send the second request in response to the receipt of the first request from the first user.

The first user is provided access to at least some of the second data (810). For example, based on the first request, the server provides the first user access to at least some of the second data that was previously not available to the first user. In one example, the server provides the first user access to one or more artifacts associated with the second user.

In some implementations, a network folder or other shared collaboration space is created and the at least some of the second data is placed in the network folder. One or more artifacts that the second user identifies may be placed in the network folder. Artifacts associated with both the second user and the common topic may be placed in the network folder.

In some implementations, at least some of the second data may be placed on another server (e.g., a cloud computing server). Any other appropriate method can be used to provide the first user access to the at least some of the second data.

The order of steps in the process 800 described above is illustrative only, and the providing the first user access to at least some of the second user's data can be performed in different orders. For example, the server may send the second request prior to sending the first message.

In some implementations, the process 800 can include additional steps, fewer steps, or some of the steps can be divided into multiple steps. For example, the server may send the first message and the second request in the same step. In some examples, the server does not provide the first user access to at least some of the second data (e.g., perform step 810).

In some implementations, the server performs one or more steps from the process 800 in conjunction with one or more steps from the process 700. For example, the server may introduce the first user and the second user when sending the second request.

Figure 9:
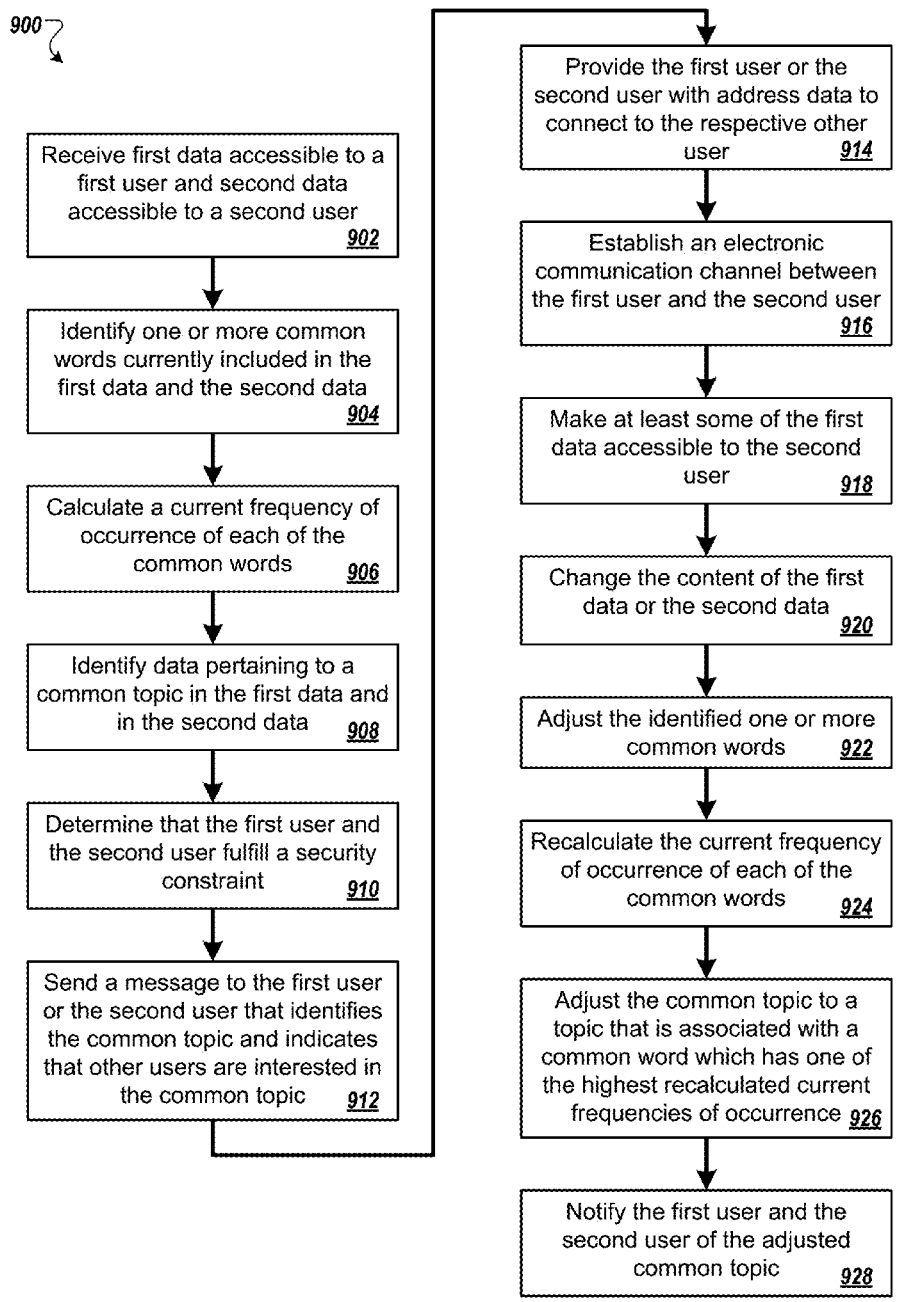

FIG. 9 is a flow diagram of a process 900 for providing a first user or a second user with address data to connect to the respective other user. For example, the process 900 can be used by the server 102 from the environment 100 shown in FIG. 1.

First data accessible to a first user and second data accessible to a second user are received (902). The first data is not accessible to the second user and the second data is not accessible to the first user.

The first data and the second data may be received at different times. For example, a server may receive the first data and then later receive the second data. In some examples, the first data is received an hour, a day, a week, a year, or multiple years prior to the second data.

In some implementations, the first data and the second data may be received over a period of time. For example, the first data may be received over a period of five years and the second data may be received over a period of two and a half years. The receipt of the first data and the second data may overlap. For example, the second data may be received during the latter two and a half years of the five year period during which the first data is received.

In some implementations, the first data is not accessible to the second user based on a permission setting associated with the first data. For example, the first user or an administrator may configure a setting that allows only the first user to access the first data. In some examples, a plurality of access permissions may be associated with different portions of the first data. The permissions may indicate that only the first user has access to the associated portion of the first data or that a subset of users, not including the second user, has access to the associated portion of the first data.

One or more common words currently included in the first data and the second data are identified (904). For example, a server analyzes the content of the first data and the second data to identify the one or more common words.

In some examples, the one or more common words may include words that are acronyms, synonyms, abbreviations, alternate spellings, expansions, different grammatical numbers, and/or otherwise have the same meaning (e.g., words in different languages) and are in the first data and the second data. For example, the server may identify the word "computer" in the first data and the word "laptop" in the second data and include both words in the one or more common words.

In some implementations, the one or more common words include phrases that have the same or similar meaning. For example, the phrase "network security" may be identified in both the first and the second data. The phrases may be identified based on a database of phrases that associates the phrases with topics. The server may use any appropriate algorithm to identify common phrases in the first data and the second data.

A phrase can be an example of an "n-gram." An n-gram is a collection of items, where 'n' is the number of items, e.g., words. For example, a phrase that contains three words is a three-gram, a phrase that contains five words is called a five-gram, and so on. In some examples, a particular n-gram can be a collection of letters, symbols, or other items other than words, or a combination of any of these things.

The server may use any appropriate algorithm to identify the common words.

A current frequency of occurrence of each of the identified one or more common words is calculated (906). For example, the server calculates a current frequency of each of the one or more common words based on a quantity of occurrences of the respective common word and the total quantity of words in the first data and/or the second data. In some examples, a current frequency is based on the total quantity of occurrences of the respective common word in both the first data or the second data and the total quantity of words in both the first data and the second data. In one example, when the common word appears in the first data five times and the second data nine times, and there are a total of 2,800 words in the first data and the second data, the frequency of occurrence of the common word is 0.5%.

In some implementations, the frequency of occurrence of a common term is an average of two values. For example, the frequency of occurrence may be the average of a first frequency of the common term in the first data and a second frequency of the common term in the second data. In one example, when the first data includes 500 words and the common term occurs five times in the first data, the first frequency is 1% and when the second data includes 2,300 words and the common term occurs nine times in the second data, the second frequency is 0.39%. In this example, the frequency of occurrence for the common word is 0.70%, e.g., (1%+0.39%)/2.

In some implementations, when two or more of the common words are related, e.g., associated with a similar topic, the current frequencies of the two or more related common words may be combined. For example, when the terms "artificial intelligence" and "intelligent agent" both occur in the first data and the second data, the current frequencies for both terms may be combined and associated with one of the terms, e.g., "artificial intelligence." The server may use any appropriate algorithm to determine whether two or more of the common words are related. For example, the server may use a database that associates words and phrases that are related.

Data pertaining to a common topic is identified in the first data and in the second data (908). The first data is accessible to a first user and not accessible to a second user, and the second data is accessible to the second user and not accessible to the first user. For example, the data pertaining to the common topic is identified by identifying the common topic as a topic that is associated with a common word of the one or more identified common words which has one of the highest current frequencies of occurrence in the first data and the second data. For example, the server may determine that a first common word that has the highest current frequency is a less important word than a second common word that has the second highest current frequency, and select the second common word and the common topic associated with the second common word. In some examples, a word may be less important if the word is a stop word, such as "the," "is," "at," and "on" to name a few examples.

In some examples, the common topic is associated with two or more common words that are associated with the same or a similar topic compared to another topic that is associated with only one of the common words. For example, a first topic may be associated with a first common word that has the highest current frequency, and a second topic may be associated with a second common word that has the third highest current frequency, a third common word that has the fourth highest current frequency, and a fourth common word that has the sixth highest current frequency, where a combination, e.g., sum, of the third highest current frequency, the fourth highest current frequency, and the sixth highest current frequency is greater than the highest current frequency. Thus, the combination of the frequencies of the second common topic is greater than the frequency of the first common topic. In this example, the server may select the second topic as a primary common topic, and use the second topic as the common topic for the process 900.

In some implementations, when the one or more common words include phrases, frequencies associated with phrases may be associated with a greater weight than frequencies associated with single non-compound words. For example, if the phrase "network security" has a frequency of occurrence of 0.5%, the word "network" has a frequency of occurrence of 0.9%, and the word "security" has a frequency of occurrence of 1%, the server may identify "network security" as the common topic, assuming that no other common words have a frequency greater than 1%.

A determination is made that the first user and the second user fulfill a security constraint (910). For example, the server determines whether the first user and the second user are permitted to discuss the common topic with other users. In some examples, when the common topic may be sensitive, the organization or organizations employing the first user and the second user may prevent the first user or the second user from collaborating on the common topic. In some examples, the organization or organizations employing the first user and the second user may prevent the first user or the second user from collaborating through an automated system without administrator approval, e.g., a system administrator or a manager of the first user or the second user.

In some implementations, the determination is made whether the first user and the second user may collaborate on a project without revealing the first data and the second data. For example, the server may facilitate collaboration between the first user and the second user on projects associated with the common topic without revealing specific details about confidential research, e.g., contained in the first data or the second data.

In some implementations, the security constraint includes one or more privacy policies. For example, the server may determine that both the first user and the second user have agreed to receive collaboration recommendations and that the server may provide information to the first user or the second user about the other user.

A message to the first user or the second user is sent that identifies the common topic and indicates the other users are interested in the common topic (912). For example, the first user may receive a message that indicates that the second user is interested in the topic "artificial intelligence" which was identified as a topic of interest to the first user.

In some implementations, the message does not specify the common topic and/or the other users but allows the recipient to indicate whether they are interested in additional information about the common topic and/or the other users.

In some implementations, the message includes details about the other users or the common topic. For example, the message sent to the first user that indicates that the second user is interested in the common topic. In some examples, the message sent to the first user indicates that other users are interested in a specific topic of interest to the first user, such as "computer science" or "database optimization."

The first user or the second user is provided with address data to connect to the respective other user (914). For example, upon the identifying of the data pertaining to the common topic, the first user or the second user may be provided with the address data to connect to the respective other user via an electronic communication channel. In some implementations, the address data is included in the message to the first user or the second user.

The address data may include an email address, phone number, an instant messaging address, or social networking contact information, to name a few examples. The address data may include any combination of types of address data depending on one or more settings specified by the first user and/or the second user. For example, the first user may configure settings to allow the server to send the first user's email address and social networking contact information to another user in a collaboration recommendation and the second user may configure settings to allow the server to send the second user's email address, instant messaging address, and web page to another user in a collaboration recommendation.

In some implementations, the determination regarding the security constraint is made before providing the message and/or the address data to the first user or the second user. For example, the server determines that the security constraints indicate collaboration restrictions or indicate that the first user and the second user may be allowed to collaborate, and provides the address data to the first user or the second user.

In some implementations, the server provides anonymous address data to the first user or the second user. For example, the server may introduce the first user and the second user through, for example, an anonymous email (e.g., emails that originate from an intermediary that substitutes anonymous email addresses for the original email addresses) or forum (e.g., a forum that stores data anonymously) and the first user or the second user may later decide to share their contact information with the other user.

An electronic communication channel between the first user and the second user is established (916). For example, the electronic communication channel may be established upon the providing of the address data.

In some examples, the electronic communication channel is established after the first user or the second user interacts with the address data. For example, when the address data includes an instant messaging address, the first user may select the instant messaging address to create an instant messaging communication channel between a first computer operated by the first user and a second computer operated by the second user, e.g., where the second computer is associated with the second user's instant messaging address. In another example, the electronic communication channel conveys data for a video or audio call between the first computer and the second computer operated by the first user and the second user respectively. In some examples, the electronic communication channel is an email conversation, e.g., one or more email messages transmitted between the first user and the second user.

In some implementations, the electronic communication channel allows the first user and the second user to access a shared workspace, such as a network folder or a non-public area in a social networking system. In some examples, the electronic communication channel allows the first user and the second user to access a shared document at the same time where the shared document may be used to collaborate on the common topic.

At least some of the first data are made accessible to the second user (918). For example, the first user or an administrator may make the at least some of the first data accessible to the second user. The at least some of the first data may include data relating to the common topic.

In some implementations, the first user makes the first data accessible to the second user by selecting an option in a message that indicates that an administrator should provide the second user with access to the at least some of the first data. For example, the administrator may change one or more permissions associated with the at least some of the first data to allow the second user access to the at least some of the second data.

In some examples, the administrator or the first user may provide the second user with a copy of the at least some of the first data. For example, the first user may send a copy of at least some of the first data, e.g., as an attachment, in an email to the second user. In another example, the first user or the administrator may place a copy of the at least some of the first data on a shared workspace that is accessible by the second user.

In some implementations, at least some of the first data is made accessible to the second user upon the providing of the address data (e.g., upon performing step 914) or upon the establishing of the electronic communication channel (e.g., upon performing step 916). For example, the server may send the second user a copy of a publication written by the first user along with the first user's email address, e.g., as the address data, in an email, based on settings specified by the first user. In some examples, when the electronic communication channel provides the first user and the second user access to the shared workspace, and the first user places the at least some of the first data in the shared workspace, the at least some of the first data is made available to the second user.

The content of the first data or the second data is changed (920). For example, the first user and/or the second user may create a new document, update an old document, or delete a document that was included in the first data or the second data, respectively. Because the data under analysis has changed, the system can determine whether or not a common topic among the users may have changed, e.g., is more specific. For example, if the users both make changes to their respective documents to include information relating to the topic of "cloud computing," the system may use the changes to determine that the common topic has changed from a general topic of "computer science" to a more specific topic of "cloud computing." In some examples, some of the first data is made accessible to the second user and is excluded from further analysis of the first data with respect to the second user.

In some implementations, when the first user or the second user delete a document, the copy of the document is not deleted from the first data or the second data depending on one or more privacy settings. For example, when the first data is a copy of the data the first user is actively working with, the server may retain the copy of the deleted document in the first data to provide the first user with better collaboration recommendations.

In some implementations, the server receives a message indicating a change to the first data or the second data and updates the first data or the second data according to the indicated changes. For example, the server may receive a message indicating that one or more documents have been altered or added to the first data and may update the first data accordingly.

In some examples, the server receives input from a first computer operated by the first user indicating changes to the first data. For example, when the first data is the actual data the first user accesses, rather than a copy of the data, when the first user opens a document, the first computer requests a copy of the document from the server. If the first computer makes any changes to the document, the first computer then sends those changes to the server so that the server makes corresponding updates to the first data.

In some implementations, the identifying of the one or more common words (e.g., performance of step 904) and/or the calculating of the current frequency of occurrence of each of the identified one or more common words (e.g., performance of step 906) are performed during a change of the first or second data (e.g., performance of step 920). For example, the server may identify the one or more common words and receive an update to the first data while calculating the current frequencies of occurrence.

In some implementations, the server may make a copy of the first data and/or the second data while identifying the one or more common words and calculating the current frequencies of occurrence so that any changes made to the first data and the second data do not affect the identification or the calculation. In some implementations, if the first data or the second data are updated while the server identifies the common words or calculates the current frequencies of occurrence, the server performs the identification and/or the calculation again when the data is not being updated. In some implementations, the server may perform the identification and calculation during off peak hours to reduce the likelihood of changes to the first data and the second data during the identification and calculation.

The identified one or more common words are adjusted (922). For example, the server determines if there are any changes to the previously identified one or more common words and adjusts the one or more common words accordingly. In some examples, the server may add one or more words to the one or more common words and/or remove one or more words from the one or more common words based on the changes to the first data and the second data.

The current frequency of occurrence of each of the identified one or more common words is recalculated (924). For example, updated frequencies of occurrence are calculated for each of the adjusted one or more identified common words as described above with respect to step 906. When one or more words are added to the common words, the frequencies of occurrence for these words are calculated for the first time.

The common topic is adjusted to a topic that is associated with a common word which has one of the highest recalculated current frequencies of occurrence (926). The common word is from the adjusted one or more identified common words and has one of the highest recalculated current frequencies of occurrence in the current first and second data.

In some implementations, the adjusted common topic is the same as the original common topic, depending on the changes to the first data and the second data. In some examples, the adjusted common topic is different from the original common topic.

The first user and the second user are notified of the adjusted common topic (928). For example, when the adjusted common topic is different than the original common topic the first user and the second user may receive a message that indicates that the adjusted common topic may be a better topic for collaboration than the original common topic. In some examples, the server does not immediately notify the first user or the second user about the adjusted common topic depending on the communication settings of the first user and the second user, respectively.

In some examples, when the adjusted common topic is different than the original common topic, the first user and the second user are notified about the adjusted common topic. For example, when the first user or the second user receive a collaboration recommendation message with only a single topic, e.g., the original common topic, and the server later identifies the adjusted common topic as having the highest recalculated current frequency of occurrence, the server may then notify the first user or the second user about the adjusted common topic.

In some implementations, for example, when the adjusted common topic is the same as the original common topic, the server does not notify the first user or the second user.

The order of steps in the process 900 described above is illustrative only, and providing the first user or the second user with the address data to connect to the respective other user can be performed in different orders. For example, the server may make at least some of the first data accessible to the second user after any of the steps 920 through 928.

In some examples, some of the steps may be performed concurrently. For example, the server may identify one or more common words, e.g., in step 904, while the content of the first data or the second data is changed, e.g., in step 920, and may calculate a current frequency of occurrence, e.g., in step 906, while the content of the first data or the second data is changed. If the content of the data is changed, the step of identifying the common words can be performed again to reflect the changed data, and the step of calculating the frequency of occurrence of words can be performed again to reflect the changed data.

In some implementations, the server may adjust the common topic prior to providing the first user or the second user with the address data. For example, the server may identify one or more common words, receive an update to the first data or the second data, adjust the identified one or more common words, identify a common topic, and provide the first user or the second user with the address data. In another example, when the first user and the second user receive collaboration recommendations on a periodic basis, when the server identifies a common topic and, prior to sending a collaboration recommendation to the first user or the second user according to the respective recommendation frequencies, receives an update to the first data or the second data, the server may adjust the common words, calculate the current frequencies of occurrence for the adjusted common words, and adjust the common topic based on the updated current frequencies of occurrence. Then the server may send a collaboration recommendation to the first user and/or the second user based on the adjusted common topic.

In some implementations, the process 900 can include additional steps, fewer steps, or some of the steps can be divided into multiple steps. For example, the server may identify the data pertaining to the common topic (e.g., perform step 908) and provide the first user or the second user with the address data to connect to the respective other user (e.g., perform step 914) without performing the other steps of the process 900.

In some implementations, the server performs steps 904, 906, and 908 as part of the same step. For example, the server may analyze the first data and the second data to identify the common topic. The analysis of the first data and the second data may include identifying the one or more common words (e.g., performing step 904), calculating the current frequency of occurrence (e.g., performing step 906), and identifying the common topic as the topic associated with the highest current frequency of occurrence (e.g., performing step 908).

In some implementations, the server may perform two or more of steps 912, 914, 916, and 918 as a single step. For example, the server may identify the common topic and create an instant messaging session between a first computer and a second computer operated by the first user and the second user, respectively, and include information about the common topic, the first user, and the second user in the instant messaging session, e.g., where the instant messaging session itself shares the address data of the first user and the second user. The first user and the second user may then determine whether to collaborate on the common topic or another topic of interest.

In some implementations, the frequency of occurrence is represented by a different type of value. For example, the frequency of occurrence may be a decimal value that is not a percentage.

In some implementations, the server performs matchmaking based on ranking the topics associated with the users in the environment 100. For example, the server identifies the topics in which a user is most interested (e.g., based on the frequency of terms associated with those topics) and provides collaboration recommendations for those topics.

In some implementations, the server ranks the topics associated with a user based on the age of the artifacts associated with the topics. For example, the server assigns a higher rank to a topic associated with artifacts a user created in the previous month than a topic only associated with artifacts that were created more than one year ago.

In some implementations, the server provides the same collaboration recommendation to a user more than once. For example, if the server determines that a user may be able to collaborate with another user on a specific topic, the server provides the user with a collaboration recommendation. At a later time, if the server determines that the user and the other user still have not communicated, or have not communicated about the specific topic, and that the two users are still interested in the common topic, the server may provide the collaboration recommendation to the user again.

In some implementations, the server provides a user with a collaboration recommendation only once. For example, after the server provides the user with the collaboration recommendation, the server does not provide the same collaboration recommendation to the user, whether or not the user communicated with another user identified in the collaboration recommendation.

In some implementations, the server performs user matchmaking for services other than work collaboration. For example, the artifacts included in the database may be university emails and the server may perform matchmaking for university students or university employees. In one example, the server may provide matchmaking recommendations as part of a user dating server.

In one example, the server may provide matchmaking recommendations for project work groups. For example, the server may identify a group of students that are currently attending the same course (e.g., artificial intelligence) and a subset of the group of students that have a common interest (e.g., robotics). The server may then provide the subset of the group of students with a matchmaking recommendation that indicates that the subset of the group of students may want to work together on a project for the course.

A few other examples of matchmaking services may include matchmaking for informal settings, community group matchmaking, and association matchmaking (e.g., for a chess club).

Figure 10:
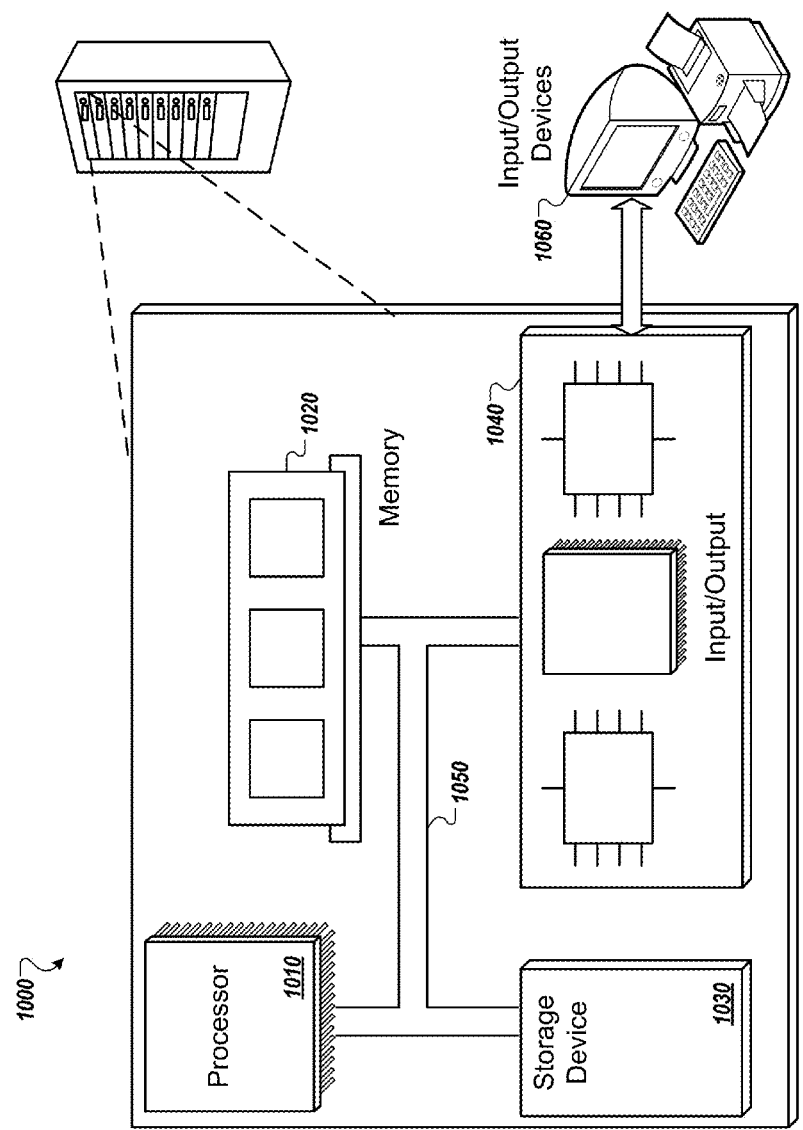

FIG. 10 is a block diagram of an example computer system 1000. For example, referring to FIG. 1, the server 102 or a server forming a portion of the server 102 could be an example of the system 1000 described here, as could a computer system used by any of the users who access resources of the environment 100, the environment 200, or the environment 300. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In some implementations, the processor 1010 is a single-threaded processor. In some implementations, the processor 1010 is a multi-threaded processor. In some implementations, the processor 1010 is a quantum computer. The processor 1010 is capable of processing instructions stored in the memory 1020 or on the storage device 1030. The processor 1010 may execute operations such as the steps described above in reference to the process 700 (FIG. 7) or the process 800 (FIG. 8).

The memory 1020 stores information within the system 1000. In some implementations, the memory 1020 is a computer-readable medium. In some implementations, the memory 1020 is a volatile memory unit. In some implementations, the memory 1020 is a non-volatile memory unit.

The storage device 1030 is capable of providing mass storage for the system 1000. In some implementations, the storage device 1030 is a computer-readable medium. In various different implementations, the storage device 1030 can include, for example, a hard disk device, an optical disk device, a solid-date drive, a flash drive, magnetic tape, or some other large capacity storage device. In some implementations, the storage device 1030 may be a cloud storage device, e.g., a logical storage device including multiple physical storage devices distributed on a network and accessed using a network. In some examples, the storage device may store long-term data, such as the artifacts in the database 108. The input/output device 1040 provides input/output operations for the system 1000. In some implementations, the input/output device 1040 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. A network interface device allows the system 1000 to communicate, for example, to transmit and receive data such as the artifacts 104*a-b* shown in FIG. 1. In some implementations, the input/output device can include driver devices configured to receive input data and send output data to other input/output devices, e.g., keyboard, printer and display devices 1060. In some implementations, mobile computing devices, mobile communication devices, and other devices can be used.

A server (e.g., a server forming a portion of the server 102 shown in FIG. 3) can be realized by instructions that upon execution cause one or more processing devices to carry out the processes and functions described above, for example, storing the artifacts 104*a-b* in the database 108 and associating topics with the artifacts in the database 108 (FIG. 3). Such instructions can include, for example, interpreted instructions such as script instructions, or executable code, or other instructions stored in a computer readable medium. A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although an example processing system has been described in FIG. 10, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for associating topics with users (FIG. 3), can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of the server 102) is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:

1. A computer-implemented method comprising: in response to a first user's data being stored in an archive, which contains first data available to the first user and not available to a second user and second data available to the second user and not available to the first user, identifying whether the first user's data pertains to a common topic;
   determining whether the first user and the second user have communicated and determining whether the first user and the second user have communicated about the common topic;
   based on the determination, sending an introduction to the first user that a) indicates that particular data not available to the first user and pertaining to the common topic is accessible upon request, b) identifies the common topic and c) identifies the second user;
   receiving, from the first user and in response to the introduction, a request to access the particular data not available to the first user and pertaining to the common topic; and
   enabling the first user and the second user to communicate about the common topic based on identifying, in the first data available to the first user and not available to the second user, and in the second data available to the second user and not available to the first user, the data pertaining to the common topic.

2. The method of claim 1 in which enabling the first user and the second user to communicate about the common topic comprises:
   sending a first communication to the first user that indicates that other users are interested in a common topic.

3. The method of claim 1 in which enabling the first user and the second user to communicate about the common topic comprises:
   sending a first communication to the first user that identifies the common topic and indicates that other users are interested in the common topic.

4. The method of claim 3 in which enabling the first user and the second user to communicate about the common topic comprises: sending a second communication to the second user that identifies the common topic and indicates that other users are interested in the common topic.

5. The method of claim 3 in which the indication that other users are interested in the common topic comprises an identification of the second user.

6. The method of claim 3 comprising receiving, based on sending the first communication, a response from the first user that indicates that the first user would like to collaborate with the second user.

7. The method of claim 6 comprising introducing the first user and the second user.

8. The method of claim 7 in which introducing the first user and the second user is based on receiving the response from the first user.

9. The method of claim 7 comprising sending the first communication to the second user and in which the first communication introduces the first user and the second user.

10. The method of claim 1 in which the first data is not available to the second user based on a permission setting associated with the first data.

11. The method of claim 10 in which the permission setting is established by the first user.

12. The method of claim 1 comprising enabling, based on the identification, the first user to make at least some of the first data available to the second user.

13. The method of claim 1 comprising sending, based on the identification, a request to the first user to make at least some of the first data available to the second user.

14. The method of claim 1 comprising enabling, in response to receipt of the request to access the particular data not available to the first user and pertaining to the common topic, the second user to make at least some of the particular data available to the first user.

15. The method of claim 1 comprising sending, in response to receipt of the request to access the particular data not available to the first user and pertaining to the common topic, a request to the second user to make at least some of the particular data available to the first user.

16. The method of claim 1 in which enabling the first user and the second user to communicate about the common topic comprises providing, based on receiving the request to access the particular data not available to the first user, the first user access to at least some of the particular data that was previously not available to the first user.

17. The method of claim 1 comprising determining, based on the identification, whether the first user and the second user communicate about the common topic; in which enabling the first user and the second user to communicate is based on determining that the first user and the second user do not communicate about the common topic.

18. The method of claim 1 comprising: receiving data from users, in which the data includes user data for each of the users and includes the first data and the second data, and the users include the first user and the second user; and analyzing the user data for each of the users to determine one or more topics associated with the user data; in which the identification is based on the analysis.

19. A system comprising:
a database storing first data available to a first user and not available to a second user, and storing second data available to the second user and not available to the first user an analysis engine configured to identify, in response to the first user's data being stored in the database, in the first data and in the second data, data pertaining to a common topic, the analysis engine further configured to determine whether the first user and the second user have communicated and whether the first user and the second user have communicated about the common topic; and a communication engine to:
based on the determination by the analysis engine, send an introduction to the first user that a) indicates that particular data not available to the first user and pertaining to the common topic is accessible upon request, b) identifies the common topic, and c) identifies the second user;

receive, from the first user and in response to the introduction, a request to access the particular data not available to the first user and pertaining to the common topic; and enable the first user and the second user to communicate about the common topic based on the analysis engine identifying, in the first data available to the first user and not available to the second user, and in the second data available to the second user and not available to the first user, the data pertaining to the common topic.

20. A computer readable storage device storing a computer program product comprising machine-readable instructions that, when executed, cause a computer system to carry out operations comprising:
in response to a first user's data being stored in an archive, which contains first data available to the first user and not available to a second user and second data available to the second user and not available to the first user, identifying whether the first user's data pertains to a common topic;

determining whether the first user and the second user have communicated and determining whether the first user and the second user have communicated about the common topic;

based on the determination, sending an introduction to the first user that a) indicates that particular data not available to the first user and pertaining to the common topic is accessible upon request and, b) identifies the common topic, and c) identifies the second user;

receiving, from the first user and in response to the introduction, a request to access the particular data not available to the first user and pertaining to the common topic; and enabling the first user and the second user to communicate about the common topic based on identifying, in the first data available to the first user and not available to the second user, and in the second data available to the second user and not available to the first user, the data pertaining to the common topic.

21. The method of claim 1, wherein the data stored in the archive includes documents and communications.

22. The method of claim 1, wherein the request received from the first user identifies the second user.

23. The method of claim 1, wherein the request received from the first user identifies the common topic.

* * * * *